(12) United States Patent
Ghazvinian Zanjani et al.

(10) Patent No.: US 12,272,163 B2
(45) Date of Patent: Apr. 8, 2025

(54) UNSUPERVISED OBJECT-ORIENTED DECOMPOSITIONAL NORMALIZING FLOW

(71) Applicant: QUALCOMM Incorporated, San Diego, CA (US)

(72) Inventors: Farhad Ghazvinian Zanjani, Almere (NL); Hanno Ackermann, Hilversum (NL); Daniel Hendricus Franciscus Dijkman, Haarlem (NL); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 460 days.

(21) Appl. No.: 17/859,913

(22) Filed: Jul. 7, 2022

(65) Prior Publication Data

US 2023/0237819 A1    Jul. 27, 2023

Related U.S. Application Data

(60) Provisional application No. 63/303,789, filed on Jan. 27, 2022.

(51) Int. Cl.
*G06V 10/82* (2022.01)
*G06T 7/194* (2017.01)
*G06V 20/70* (2022.01)

(52) U.S. Cl.
CPC .............. *G06V 20/70* (2022.01); *G06T 7/194* (2017.01); *G06V 10/82* (2022.01); *G06T 2207/20081* (2013.01); *G06T 2207/20084* (2013.01)

(58) Field of Classification Search
CPC ........ G06V 20/70; G06V 10/82; G06V 10/25; G06V 10/454; G06V 20/52; G06T 7/194; G06T 2207/20081; G06T 2207/20084; G06T 7/00; G06T 2207/10016; G06T 2207/10024; G06T 2207/10028; G06T 2207/20076; G06T 2207/30244; G06N 3/044; G06N 3/0455; G06N 3/0475; G06N 3/088; G06N 3/094
See application file for complete search history.

(56) References Cited

U.S. PATENT DOCUMENTS

| | | | |
|---|---|---|---|
| 8,300,894 B2 * | 10/2012 | Chien | H04N 5/91 382/175 |
| 2022/0101087 A1 * | 3/2022 | Lee | G06N 3/084 |
| 2024/0303825 A1 * | 9/2024 | Brown | G06V 10/776 |

* cited by examiner

*Primary Examiner* — Dov Popovici
(74) *Attorney, Agent, or Firm* — QUALCOMM Incorporated

(57) ABSTRACT

Systems and techniques are provided for unsupervised scene-decompositional normalizing flows. An example process can include obtaining a scene-decompositional model having a normalizing flow neural network architecture. The process can include determining, based on processing data depicting multiple targets in a scene using the scene-decompositional model, a distribution of scene data as a mixture of flows from one or more background components and one or more foreground components. The process can further include identifying, based on processing the distribution of scene data using the scene-decompositional model, a target associated with the one or more foreground components and included in the data depicting the multiple targets in the scene.

30 Claims, 14 Drawing Sheets

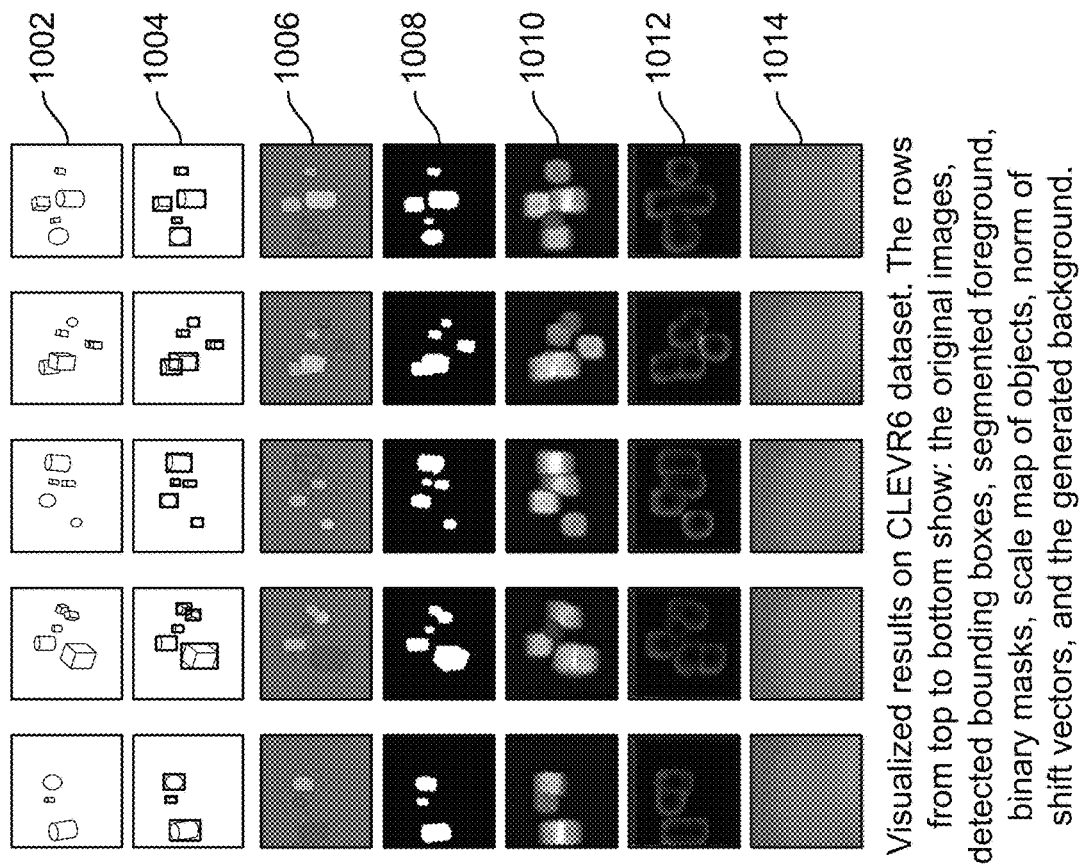

FIG. 10

Visualized results on CLEVR6 dataset. The rows from top to bottom show: the original images, detected bounding boxes, segmented foreground, binary masks, scale map of objects, norm of shift vectors, and the generated background.

Table 1

| Method | Framework | Metric |
|---|---|---|
| IODINE (Greff et al., 2019) | VAE+RNN | 98.8 ± 0.0 |
| MONet (Burgess et al., 2019) | VAE+RNN+CNN | 96.2 ± 0.6 |
| Slot Att. (Locatello et al., 2020) | Transformer | 98.8 ± 0.3 |
| ObSuRF (Stelzner et al., 2021) | NeRF | 98.3 ± 0.8 |
| Sprites (Monnier et al., 2021) | DTI | 97.2 ± 0.2 |
| DeNF (ours) | NF | 96.3 ± 0.2 |

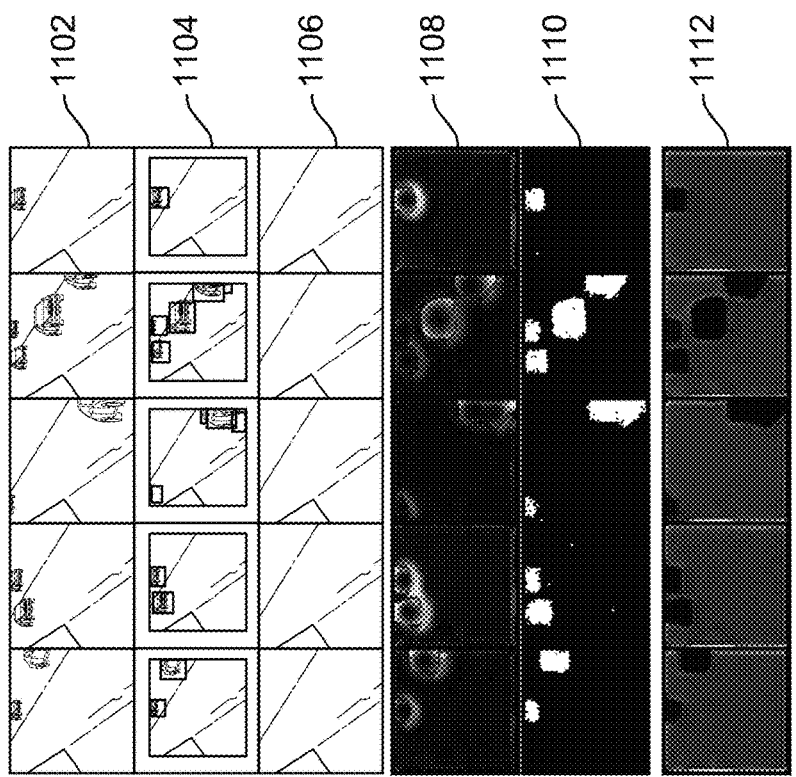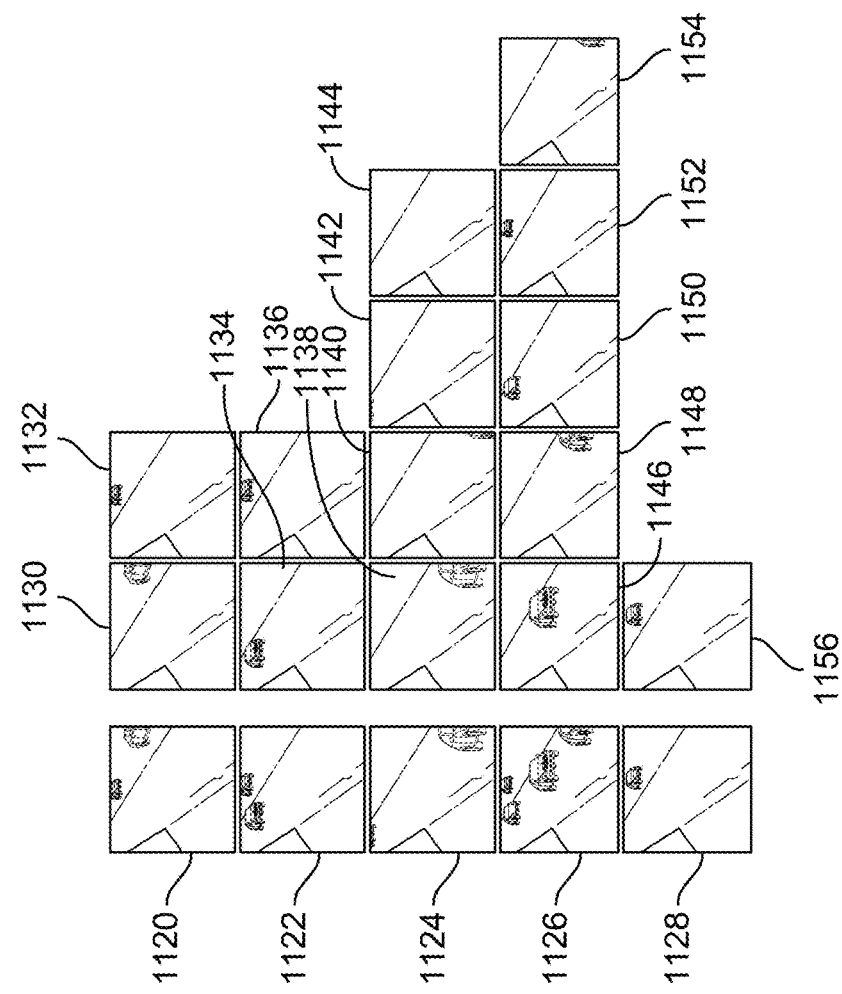
FIG. 11

1200

Visualized spectrogram of WiFi signal generated by using Pylayers simulator when two persons are walking in the room.

1300

Determine, Based On Data Depicting Multiple Targets In A Scene, A Distribution Of Scene Data As A Mixture Of Flows From One Or More Background Components And One Or More Foreground Components, The Distribution Of Scene Data Being Determined Using A Scene-Decompositional Model Having A Normalizing Flow Neural Network Architecture
1302

Process The Distribution Of Scene Data Using The Scene-Decompositional Model
1304

Identify, Based On The Processing Of The Distribution Of The Scene Data Using The Scene-Decompositional Model, A Target Associated With The One Or More Foreground Components And Included In The Data Depicting The Multiple Targets In The Scene
1306

Output A Representation Of The Target
1308

UNSUPERVISED OBJECT-ORIENTED DECOMPOSITIONAL NORMALIZING FLOW

CROSS-REFERENCE TO RELATED APPLICATIONS

This application claims priority to U.S. Provisional Patent Application No. 63/303,789, filed on Jan. 27, 2022, entitled "UNSUPERVISED OBJECT-ORIENTED DECOMPOSITIONAL NORMALIZING FLOW", the contents of which are hereby incorporated by reference in their entirety and for all purposes.

TECHNICAL FIELD

The present disclosure generally relates to machine learning. For example, aspects of the present disclosure relate to techniques and systems for an unsupervised machine learning model for scene decomposition.

BACKGROUND

Electronic devices are increasingly equipped with camera hardware that can be used to capture image frames (e.g., still images and/or video frames) for consumption. For example, an electronic device (e.g., a mobile device, an Internet Protocol (IP) camera, an extended reality device, a connected device, a laptop computer, a smartphone, a smart wearable device, a game console, etc.) can include one or more cameras integrated with the electronic device. The electronic device can use the camera to capture an image or video of a scene, a person, an object, or anything else of interest to a user of the electronic device. The electronic device can capture (e.g., via the camera) an image or video and process, output, and/or store the image or video for consumption (e.g., displayed on the electronic device, saved on a storage, sent or streamed to another device, etc.). In some cases, the electronic device can further process the image or video for certain effects such as depth-of-field or portrait effects, extended reality (e.g., augmented reality, virtual reality, and the like) effects, image stylization effects, image enhancement effects, etc., and/or for certain applications such as computer vision, extended reality, object detection, recognition (e.g., face recognition, object recognition, scene recognition, etc.), compression, feature extraction, authentication, segmentation, and automation, among others.

In some cases, neural networks can be used to perform various tasks such as, for example, scene or object detection and/or recognition, among other tasks. Neural network systems can be versatile and can achieve high quality results in a variety of tasks. However, while neural networks can be versatile and accurate, neural networks generally require high memory bandwidth and high computational costs. In some cases, the computational complexity associated with neural networks can be prohibitively high. Additionally, training neural network models can be challenging.

SUMMARY

Systems and techniques are described herein for performing scene decomposition using an machine learning model. According to at least one example, a method for processing data is provided. The method may include: determining, based on processing data depicting multiple targets in a scene using a scene-decompositional model having a normalizing flow neural network architecture, a distribution of scene data as a mixture of flows from one or more background components and one or more foreground components; processing the distribution of scene data using the scene-decompositional model; identifying, based on the processing of the distribution of the scene data using the scene-decompositional model, a target associated with the one or more foreground components and included in the data depicting the multiple targets in the scene; and outputting a representation of the target.

In another example, an apparatus for processing data is provided. The apparatus includes at least one memory and at least one processor coupled to the at least one memory. The at least one processor configured to: determine, based on data depicting multiple targets in a scene, a distribution of scene data as a mixture of flows from one or more background components and one or more foreground components, the distribution of scene data being determined using a scene-decompositional model having a normalizing flow neural network architecture; process the distribution of scene data using the scene-decompositional model; identify, based on the processing of the distribution of the scene data using the scene-decompositional model, a target associated with the one or more foreground components and included in the data depicting the multiple targets in the scene; and output a representation of the target.

In another example, at least one non-transitory computer-readable medium is provided containing instructions which, when executed by one or more processors, cause the one or more processors to: determine, based on data depicting multiple targets in a scene, a distribution of scene data as a mixture of flows from one or more background components and one or more foreground components, the distribution of scene data being determined using a scene-decompositional model having a normalizing flow neural network architecture; process the distribution of scene data using the scene-decompositional model; identify, based on the processing of the distribution of the scene data using the scene-decompositional model, a target associated with the one or more foreground components and included in the data depicting the multiple targets in the scene; and output a representation of the target.

In another example, an apparatus for processing data is provided. The apparatus may include: means for determining, based on processing data depicting multiple targets in a scene using a scene-decompositional model having a normalizing flow neural network architecture, a distribution of scene data as a mixture of flows from one or more background components and one or more foreground components; means for processing the distribution of scene data using the scene-decompositional model; means for identifying, based on the processing of the distribution of the scene data using the scene-decompositional model, a target associated with the one or more foreground components and included in the data depicting the multiple targets in the scene; and means for outputting a representation of the target.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile or wireless communication device (e.g., a mobile telephone or other mobile device), a wearable device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 10 illustrates decomposition and object representation results on an image dataset that includes multiple objects in the scene, in accordance with some examples of the present disclosure;

FIG. 11 illustrates decomposition and scene representation results on real traffic image data, in accordance with some examples of the present disclosure;

FIG. 13 is a flowchart illustrating an example process for scene decomposition, in accordance with some examples of the present disclosure.

DETAILED DESCRIPTION

Figure 1:
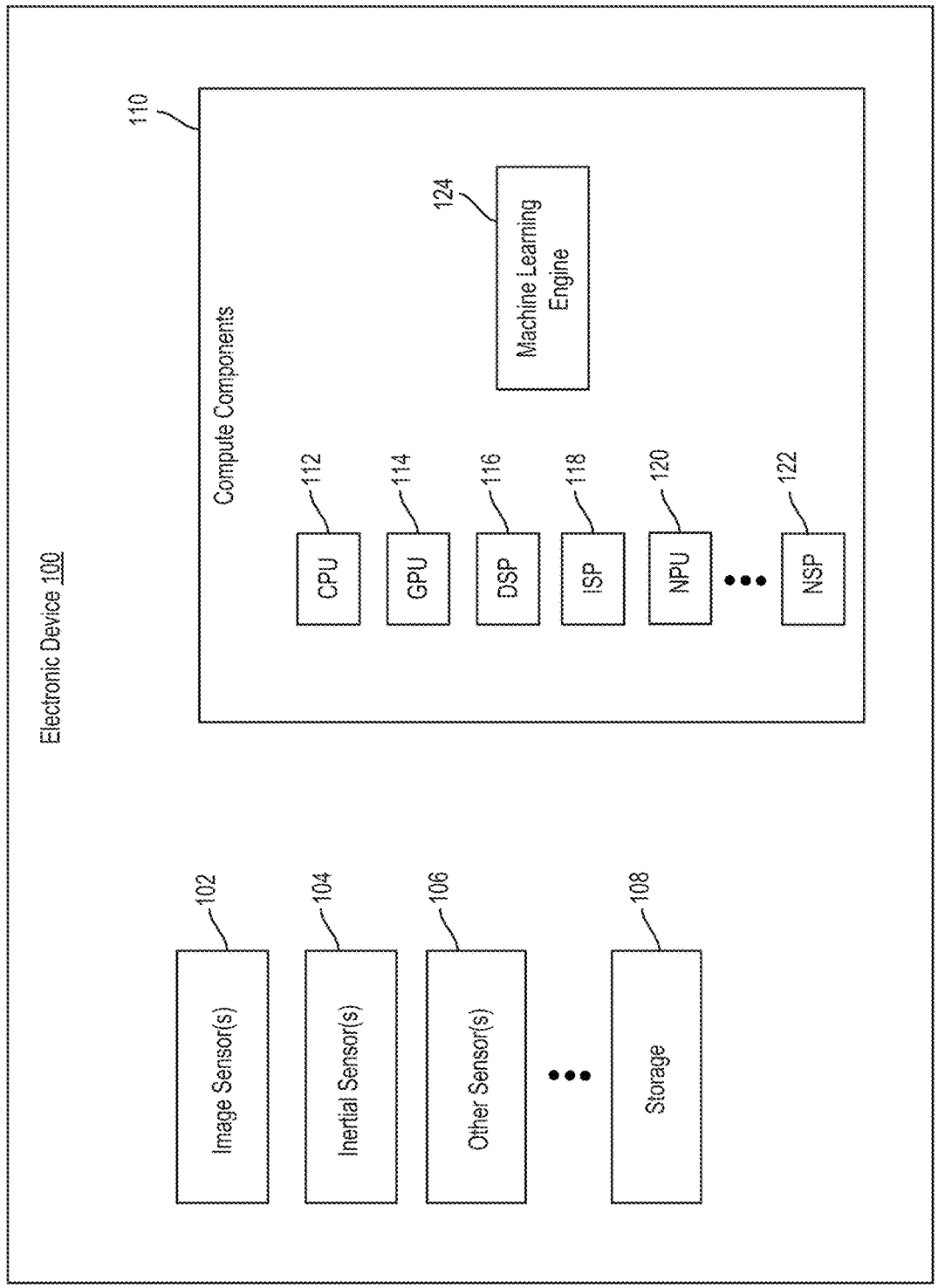
FIG. 1 is a simplified block diagram illustrating an example electronic device, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing the example aspects. It should be understood that various changes may be made in the function and arrangement of elements without departing from the scope of the application as set forth in the appended claims.

As previously explained, many electronic devices include camera hardware used to capture images and/or videos for consumption. In some cases, image data captured using one or more cameras of an electronic device can be used to perform object or scene detection and/or recognition. For example, the electronic device can perform object recognition to identify or verify an object from a digital image or a video frame. In some cases, neural networks can be used to perform the object or scene detection and/or recognition, as well as a number of other tasks. Neural network systems can be versatile and can achieve high quality results in a variety of tasks.

However, while neural network systems can be versatile and accurate, the neural network systems generally require high memory bandwidth and high computational costs. In some cases, the computational complexity associated with neural network systems can be prohibitively high.

In some cases, the electronic device can use compositional modeling (e.g., using one or more compositional learning models, such as a decompositional model) to reduce the complexity of the data processed by a neural network and/or the computational complexity of the neural network. Compositional modeling is a process of decomposing a scene of an image into components or primitives (e.g., corresponding to objects in the image). For instance, compositional modeling allows complex data of an image to be represented with a finite set of primitives across various scenarios. The electronic device can recombine the finite set of primitives to produce a large number of useful and coherent concepts. In some cases, the prospect of acquiring object representations using compositional learning models can help extend the generality and applicability of machine learning solutions to support the analysis of data containing patterns of multiple objects. Machine learning models trained using unsupervised training (referred to herein as "unsupervised machine learning models" or "unsupervised learning models") can be used for a variety of tasks such as, for example and without limitation, scene or object detection and/or recognition, person or object localization in image data or radio frequency (RF) signals, among others. In some examples, the unsupervised learning models can use prior information and/or inductive biases to achieve remarkable results in a wide range of areas.

The compositional modeling described herein can be used for a wide range of applications. In some examples, compositional modeling can be used in the context of object-instance decomposition (which can be referred to as a decompositional model), as further described herein. The decompositional model can decompose a scene of an image into components or primitives, as noted above. In some cases, when a computational model (e.g., including deep learning models) can only solve a task by assuming measured data conveys pattern/information of a single object, a decompositional model can be used to perform decomposition techniques to extend the application of the computational model for the multi-object cases/scenarios. In some examples, a decompositional model can be used as a wrapper technique in a broad range of machine learning processes when extension of such processes to multi-instance use cases is complex. Non-limiting examples of such machine learning processes can include manifold learning processes, deep metric learning processes, and clustering processes, among others.

Manifold learning processes provide non-linear dimensionality reduction and can be based on an assumption that dimensionality of a data set is only artificially high. For instance, given high-dimensional embedded data (e.g., an image), a manifold learning process can determine a low-dimensional representation of the data, where the low-dimensional representation preserves certain relationships within the data. Generally, manifold learning processes cannot be used when the input data includes representations of more than one object. However, in some cases, manifold learning processes may only work if the source of the variation in the data is a single entity. An example technique to solve such issues with manifold learning processes is to decompose the data. Deep metric learning processes can be used, for example, when the sampling strategy is based on a similarity of instances in a pair of examples. In some cases, if there are more than one semantic instance in the samples or pairs, then the deep metric learning results and/or data can be ambiguous.

As noted above, clustering processes are another example of machine learning processes that determine natural groupings of data in a data set. For example, clustering processes can be used when input samples have more than one semantic label with a combinatorial selection. However, in some cases, clustering processes assume a single semantic label. Clustering use cases involving multiple semantic labels can result in a multi-label problem that may prevent the clustering processes from working properly. For example, assume that an electronic device is configured to implement a clustering algorithm to cluster a collection of images of cars based on their brand or color. This would be a fairly simple task in cases where each image only depicts one car. However, in cases where some of the images in the collection depict more than one car, the clustering algorithm would fail to cluster the collection of images since the data associated with some of the images contains a compositional scene.

Systems, apparatuses, processes (also referred to as methods), and computer-readable media (collectively referred to as "systems and techniques") are described herein for implementing unsupervised machine learning models. In some examples, the systems and techniques described herein can implement unsupervised learning models that support multi-target or multi-object scenarios. In some examples, the systems and techniques described herein can implement an unsupervised object-centric scene decomposition model that can learn a compositional and hierachical representation of multi-object scene data (e.g., image data depicting multiple objects), and can abstract the multi-object scene data into object entities and spaces. Other approaches can be based on variational autoencoder (VAE) frameworks or generative adversarial network (GAN) frameworks, which can learn a set of structured latent variables that can generate the scene.

In some examples, the systems and techniques described herein can implement a probabilistic model (e.g., a decompositional network, a flow-based model, a decompositional normalizing flow (DeNF), etc.) based on normalizing flows. The probabilistic model can model a scene as a mixture of bidirectional flows that map a set of structured prior distributions into the scene data distribution. In some examples, the probabilistic model can be used on image data and/or radio frequency (RF) data (e.g., Wi-Fi data) for scene decomposition.

In some examples, the unsupervised learning models can be implemented for localization and/or scene decomposition in scenarios where the input data includes multiple objects. For example, the systems and techniques described herein can implement an unsupervised learning model for scene decomposition based on the data that contains multiple objects. The unsupervised learning model can decompose each sample of visual or RF signals into several signals with each of the several signals containing the pattern of a single object instance. The decomposition of multi-object data can enable the systems and techniques described herein to apply a large family of unsupervised techniques to the decomposed data. For example, the problem of person localization in Wi-Fi data can be solved using unsupervised learning models (e.g., manifold learning techniques, deep metric learning techniques, etc.) if only a single person exists in the scene. However, the localization by the unsupervised learning models may otherwise fail if there are multiple people in the scene. Nevertheless, the systems and techniques described herein for decompositional modelling can address multi-person scenarios and successfully perform the localization even if there are multiple people in the scene.

In some cases, an unsupervised localization process can be extended to support multi-target scenarios. For example, an unsupervised localization process can be extended to support multi-target scenarios based on images or RF signals (e.g., Wi-Fi signals, etc.). In some aspects, the systems and techniques described herein can perform probabilistic modeling using normalizing flow models. Normalizing flow models are a family of generative models that can be used to construct flexible probability distributions over continuous random variables. For example, assume that $x \in \mathbb{R}^D$ is a real vector (e.g., a vector of image pixels). To define a joint distribution over x, a flow-based model can express x as a transformation $f=f_1, \ldots, f_k$ of real vector z sampled from a base distribution $p_z(z)$: $x=f(z)$, where $z \sim p_z(z)$.

As previously explained, the transformation f can be invertible (e.g., bijective) and both f and $f^{-1}$ can be differentiable. In some examples, the transformation f can be implemented by a neural network. In some cases, the z in the transformation can be D-dimensional. Under such considerations, the probability density of x can be obtained using the equation below:

$$P_x(x) = p_z(z) \cdot |\det J_f(z)|^{-1} \text{ where } z = f^{-1}(x) \quad \text{Equation (1)}$$

In some examples, by changing variables, the probability density of x can be obtained as follows:

$$p_x(x) = p_z(f^{-1}(x)) \cdot |\det J_{f^{-1}}(x)| \quad \text{Equation (2)}$$

In Equations 1 and 2, $J_f$ represents the Jacobian of "f".

In some cases, the normalizing flow models can have several constraints. In some examples, a constraint of the normalizing flow models can be that the transformation f should be invertible (e.g., bijective). Another example constraint of the normalizing flow models can be that the dimensionality of the inputs and outputs should be the same. In some examples, the normalizing flow models described herein can be invertible and maintain the dimensionality of inputs and outputs.

Examples of the systems and techniques described herein for processing data are illustrated in FIG. 1 through FIG. 14 and described below.

FIG. 1 is a diagram illustrating an example electronic device 100, in accordance with some examples of the disclosure. The electronic device 100 can implement the systems and techniques disclosed herein. For example, in some cases, the electronic device 100 can implement unsupervised machine learning models that support multi-target or multi-object scenarios, as further described herein. In some examples, the electronic device 100 can implement an unsupervised object-centric scene decomposition model that can learn a compositional and hierarchical representation of multi-object scene data (e.g., image data depicting multiple objects), and can abstract the multi-object scene data into object entities and spaces.

The electronic device 100 can also perform various tasks and operations such as, for example and without limitation, extended reality (e.g., augmented reality, virtual reality, mixed reality, virtual reality with pass-through video, and/or the like) tasks and operations (e.g., tracking, mapping, localization, content rendering, pose estimation, object detection/recognition, etc.), image/video processing and/or post-processing, data processing and/or post-processing, computer graphics, machine vision, object modeling and registration, multimedia rendering and/or composition, object detection, object recognition, localization, scene recognition, and/or any other data processing tasks, effects, and/or computations.

In the example shown in FIG. 1, the electronic device 100 includes one or more image sensors 102, one or more inertial sensors 104 (e.g., one or more inertial measurement units, etc.), one or more other sensors 106 (e.g., one or more radio detection and ranging (radar) sensors, light detection and ranging (LIDAR) sensors, acoustic/sound sensors, infrared (IR) sensors, magnetometers, touch sensors, laser rangefinders, light sensors, proximity sensors, motion sensors, active pixel sensors, machine vision sensors, ultrasonic sensors, etc.), storage 108, compute components 110, and a machine learning engine 124. In some cases, the electronic device 100 can include additional software and/or software engines such as, for example, an extended reality (XR) engine, an image processing engine, a rendering engine, etc.

The components 102 through 124 shown in FIG. 1 are non-limiting examples provided for illustration and explanation purposes. In other examples, the electronic device 100 can include more, less, and/or different components than those shown in FIG. 1. For example, in some cases, the electronic device 100 can include one or more display devices, one more other processing engines, one or more receivers (e.g., global positioning systems, global navigation satellite systems, etc.), one or more communications devices (e.g., radio frequency (RF) interfaces and/or any other wireless/wired communications receivers/transmitters), one or more other hardware components, and/or one or more other software and/or hardware components that are not shown in FIG. 1. An example architecture and example hardware components that can be implemented by the electronic device 100 are further described below with respect to FIG. 14.

The one or more image sensors 102 can include any number of image sensors. For example, the one or more image sensors 102 can include a single image sensor, two image sensors in a dual-camera implementation, or more than two image sensors in other, multi-camera implementations. The electronic device 100 can be part of, or implemented by, a single computing device or multiple computing devices. In some examples, the electronic device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the one or more image sensors 102, one or more inertial sensor(s) 104, the other sensor(s) 106, storage 108, compute components 110, and machine learning engine 124 can be part of the same computing device. For example, in some cases, the one or more image sensors 102, one or more inertial sensor(s) 104, one or more other sensor(s) 106, storage 108, compute components 110, and machine learning engine 124 can be integrated into a smartphone, laptop, tablet computer, smart wearable device, gaming system, and/or any other computing device. In other implementations, the one or more image sensors 102, one or more inertial sensor(s) 104, the other sensor(s) 106, storage 108, compute components 110, and machine learning engine 124 can be part of two or more separate computing devices. For example, in some cases, some of the components 102 through 124 can be part of, or implemented by, one computing device and the remaining components can be part of, or implemented by, one or more other computing devices.

The one or more image sensors 102 can include one or more image sensor. In some examples, the one or more image sensors 102 can include any image and/or video sensors or capturing devices, such as a digital camera sensor, a video camera sensor, a smartphone camera sensor, an image/video capture device on an electronic apparatus such as a television or computer, a camera, etc. In some cases, the one or more image sensors 102 can be part of a multi-camera system or a computing device such as an extended reality (XR) device (e.g., an HMD, smart glasses, etc.), a digital camera system, a smartphone, a smart television, a game system, etc. The one or more image sensors 102 can capture image and/or video content (e.g., raw image and/or video data), which can be processed by the compute components 110.

In some examples, the one or more image sensors 102 can capture image data and generate frames based on the image data and/or provide the image data or frames to the compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

The electronic device 100 can optionally include one or more inertial sensors 104. The one or more inertial sensors 104 can detect a specific force and angular rate of the electronic device 100. In some cases, the one or more inertial sensors 104 can detect an orientation of the electronic device 100. The one or more inertial sensors 104 can generate linear acceleration measurements, rotational rate measurements, and/or heading measurements. In some examples, the one or more inertial sensors 104 can be used to measure the pitch, roll, and yaw of the electronic device 100.

The electronic device 100 can optionally include one or more other sensor(s) 106. In some examples, the one or more other sensor(s) 106 can detect and generate other measurements used by the electronic device 100. In some cases, the compute components 110 can use data and/or measurements from the one or more image sensors 102, the one or more inertial sensors 104, and/or the one or more other sensor(s) 106 to track a pose of the electronic device 100. As previously noted, in other examples, the electronic device 100 can also include other sensors, such as a magnetometer, an acoustic/sound sensor, an IR sensor, a machine vision sensor, a smart scene sensor, a radar sensor, a LIDAR sensor, a light sensor, etc.

The storage 108 can be any storage device(s) for storing data. Moreover, the storage 108 can store data from any of the components of the electronic device 100. For example, the storage 108 can store data from the one or more image sensors 102 (e.g., image or video data), data from the one or more inertial sensors 104 (e.g., measurements), data from the one or more other sensors 106 (e.g., measurements), data from the compute components 110 (e.g., processing parameters, timestamps, preferences, virtual content, rendering content, scene maps, tracking and localization data, object detection data, configurations, XR application data, recognition data, synchronization data, outputs, etc.), and/or data from the machine learning engine 124. In some examples, the storage 108 can include a buffer for storing frames and/or other camera data for processing by the compute components 110.

The one or more compute components 110 can include a central processing unit (CPU) 112, a graphics processing unit (GPU) 114, a digital signal processor (DSP) 116, an image signal processor (ISP) 118, neural processing unit (NPU), a neural network signal processor (NSP), and/or other processors or processing units. The compute components 110 can perform various operations such as camera synchronization, image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, object detection, and any of the various operations described herein.

In some examples, the machine learning engine 124 can implement an unsupervised learning model for scene decomposition, object detection, and/or localization based on data that contains (e.g., depicts, reflects or represents, etc.) multiple objects or targets. In some cases, the machine learning engine 124 can perform decompositional modelling for multi-target scenarios, as further described herein. In some examples, the machine learning engine 124 can implement an unsupervised learning model that decomposes each sample of visual or RF signals into several signals with each of the several signals containing the pattern of a single object instance. The machine learning engine 124 can include one or more neural network models, such as the unsupervised learning models described herein. In some cases, the compute components 110 can be used to implement the machine learning engine 124. For example, the operations for the machine learning engine 124 can be implemented by any of the compute components 110 (e.g., the CPU 112, the GPU 114, the DSP 116, the NPU 118, the NSP 120, or any combination thereof). In some examples, the compute components 110 can also implement one or more other processing engines.

While the electronic device 100 is shown to include certain components, one of ordinary skill will appreciate that the electronic device 100 can include more or fewer components than those shown in FIG. 1. For example, the electronic device 100 can also include, in some instances, one or more memory devices (e.g., RAM, ROM, cache, and/or the like), one or more network interfaces (e.g., wired and/or wireless communications interfaces and the like), one or more display devices, and/or other hardware or processing devices that are not shown in FIG. 1. An illustrative example of a computing device and hardware components that can be implemented with the electronic device 100 is described below with respect to FIG. 14.

Moreover, references to any of the components of the electronic device 100 in the singular should not be interpreted as limiting the number of such components implemented by the electronic device 100 to one. For example, references to a processor in the singular form should not be interpreted as limiting the number of processors implemented by the electronic device 100 to one.

As previously explained, unsupervised learning of structured representation of a scene using a collection of measured signals such as visual data or radio frequency signals is a challenging task. In unsupervised object-centric scene decomposition, the compositional property of measured data from the scene can be used as an inductive bias in the learning model to decompose it into object instances and spaces. This explicit representation of objects has many advantages over the implicit representation of deep learning methods.

Other approaches of object-centric scene decomposition and generation are based on VAE or GAN frameworks. By maximizing the evidence lower bound (ELBO) in VAE-based models or minimizing a discrepancy between the input and transformed noise distributions in GAN-based models, a set of structured latent variables can be learned that represents the objects in the scene. The decompositional network described herein (referred to as decompositional normalizing flow (DeNF)) can instead implement flow-based models. The DeNF is an unsupervised probabilistic model that maps the distribution of scene data into a mixture of prior distributions on latent variables. Once trained, the DeNF can use an invertible neural network capable of bi-directional inferences, and generate a diverse set of scene data by preserving only a subset of objects in the original scene and vice versa. Structuring the object-centric latent variables in the DeNF can employ a spatial attention mechanism.

Other approaches for unsupervised object-oriented image (de)composition can include, for example, frameworks based on GANs or VAEs. GAN-based object-oriented scene generation can be based on ConvNets or a Neural Radiance Fields (NeRFs) module, which can render a scene by decoding a structured latent variable. The discriminator model of a GAN learns to distinguish the real scene data from the fake samples that are produced by the ConvNets or NeRFs as the generator model. Two models are trained as they are playing a minimax game. Such GAN-based approaches are computationally expensive and may have stability issues in optimization.

VAE-based models can be used to decompose a scene into object-centric representations. The resulting object representations are then decoded to reconstruct the input image. Different types of VAE-based models can be used. For example, a Multi-Object Network (MONet) relies on training a VAE together with a deterministic recurrent attention network to provide attention masks around regions of images. A recurrent attention network embeds a convolutional neural network (CNN) in a recurrent neural network (RNN) which can cause scalability issues. An iterative Object Decomposition Inference NEtwork (IODINE) models a scene as a spatial mixture of objects and a background and uses amortized iterative refinement of latent object representations within the variational framework, which is expensive both in terms of computation and memory thus limiting its practicality and utility. GENErative Scene Inference and Sampling (GENESIS) also uses a spatial mixture model which is encoded by component-wise latent variables. A GENESIS model parameterizes a spatial GMM over images decoded from a set of object-centric latent variables that are either inferred sequentially in an amortized fashion or sampled from an autoregressive prior.

Other approaches can use VAE-based generative models along with a spatial attention. Such VAE-based models structure the latent representation of objects with what, where, and presence variables. For example, an Attend-Infer-Repeat (AIR) model uses an RNN to sequentially process the objects in a scene but does not scale well to images with many objects. A spatially Invariant Attend, Infer, Repeat (SPAIR) model addressed these shortcomings by replacing the RNN with a CNN. At the core of SPAIR is a convolutional object detector, similar to that used in You Only Look Once (YOLO), which maps from an image to objects. This allows the model to specify the locations of objects relative to local grid cells rather than the entire image, which allows for spatially invariant computations. In an encoder network of the model, the image is first mapped into the feature volume with a predefined grid size and all the cells in the grid are then processed sequentially to produce objects. SPACE detects a foreground object on a grid size but the process is performed in parallel and scales well to a large number of objects. In GMAIR, the spatial attention is combined with Gaussian mixture prior in a VAE-based model to cluster discovered objects. This allows the model additionally, to categorize the what latent variables of objects.

The latent variables in DeNF can be used to represent objects in the scene. For example, in some cases, the objects in a scene can be represented by what, where, and presence latent variables. The DeNF can be based on a normalizing flows probabilistic framework. This can allow the electronic device 100 to compute exact likelihoods by employing an invertible neural architecture that maps the scene data distributions into a mixture of prior distributions on structured latent variables.

The DeNF (e.g., the DeNF illustrated in FIG. 4) can provide a probabilistic generative model based on a mixture of normalizing flows. Normalizing flows (NFs) provide a general way of constructing flexible probability distributions over continuous random variables. For example, let $x \in \mathbb{R}^d$ be a real vector, and assume that a joint distribution p(x) is to be defined over x. The flow-based modeling can express x through a learned invertible transformation $x=f_\theta(z)$ that warps a real vector $z$ sampled from a base distribution $p(z)$. Making use of the change of variables, the p(x) can be written as:

$$\log p_\theta(x) = \log p_z(z) + \log \left| \det\left(\frac{\partial f_\theta^{-1}(x)}{\partial x}\right) \right|.$$

In some cases, in a flow-based model, $f_\theta: \mathbb{R}^d \to \mathbb{R}^d$ can be constructed by stacking several invertible and differentiable simpler learning mappings (e.g., $f_\theta = f_\theta^1 \circ \ldots \circ f_\theta^L$) and a log-determinant obtained as the sum of log-determinants of the mappings. The previous equation for $\log p_\theta(x)$ allows for exact maximum likelihood learning that is not tractable in VAE and GAN-based generative models.

The DeNF can model the measured data from a scene as the composition of two independent generative processes that construct the background and foreground parts of the scene data. The mapping $f_\theta$ can be extended to a mapping of background $z_{bg}$ and foreground $z_{fg}$ components to the non-overlapping elements of x (e.g., pixels of an image). In some examples, this many-to-one transformation can be specified as follows:

$$p_x(x) = \Sigma_{i \in I} p_z(f_i^{-1}(x)) |\det J_{f_i^{-1}}(x)| \qquad \text{Equation (3)}$$

$$= p_{z_{fg}}(f_{fg}^{-1}(x)) |\det J_{f_{fg}^{-1}}(x)| +$$

$$p_{z_{bg}}(f_{bg}^{-1}(x)) |\det J_{f_{bg}^{-1}}(x)|$$

The DeNF can have a multi-scale architecture. Since the $z$ and x can be configured to have a same dimensionality in a flow model, a multi-scale transformation reduces the computational cost and memory requirement of implementing the $f_\theta$ up to L layers by clamping a number of sub-dimensions of $z_{k<L}$ and leaving them out for further transformations. This is also beneficial for a natural modeling choice for granular data types such as images and waveforms.

In an example multi-scale DeNF architecture, after applying a number (e.g., four in the examples herein) of transformation layers that are each implemented by the coupling layer, the $z$ vector is split into two partitions. The first partition is identified as background components $z_{bg}$ and the second partition is further processed through a deeper layer(s) of the network. The background component can be factored out at a finer scale (e.g., in an earlier layer) $z_{bg} \in \mathbb{R}^n (n<d)$ and Gaussianized $z_{bg} \sim N(0,1)$. The flow-based formulation allows for exact maximum likelihood learning.

The forward Kullback-Leibler (KL) divergence between flow-based model $p_x(x;\theta)$ and a target distribution $p_x^*(x)$ can be written as follows:

$$\mathcal{L}_{bg}^{forward}(\theta) = D_{KL}[p_x^*(x) \| p_x(x;\theta)]$$
$$= -\mathbb{E}_{p_x^*(x)}[\log p_x(x;\theta)] + const \qquad \text{Equation (4)}$$

Figure 2A:
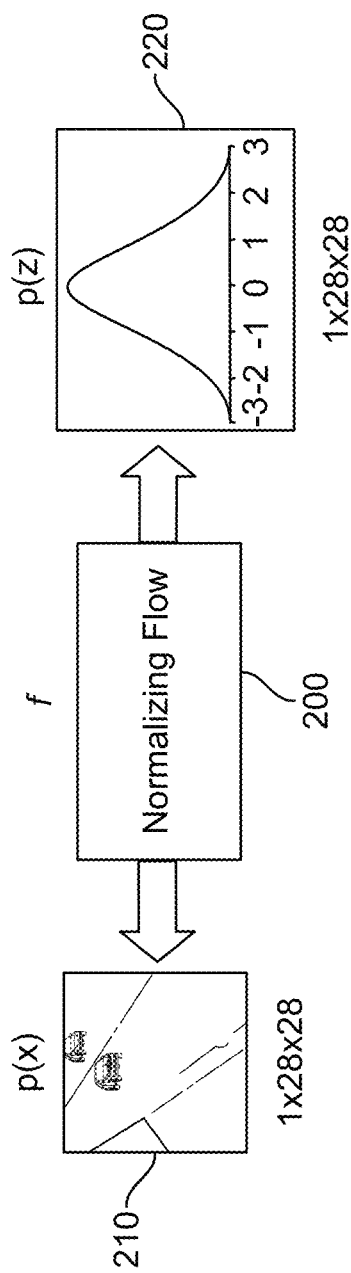
FIG. 2A is a diagram illustrating an example normalizing flow model, in accordance with some examples of the present disclosure.
Figure 2B:
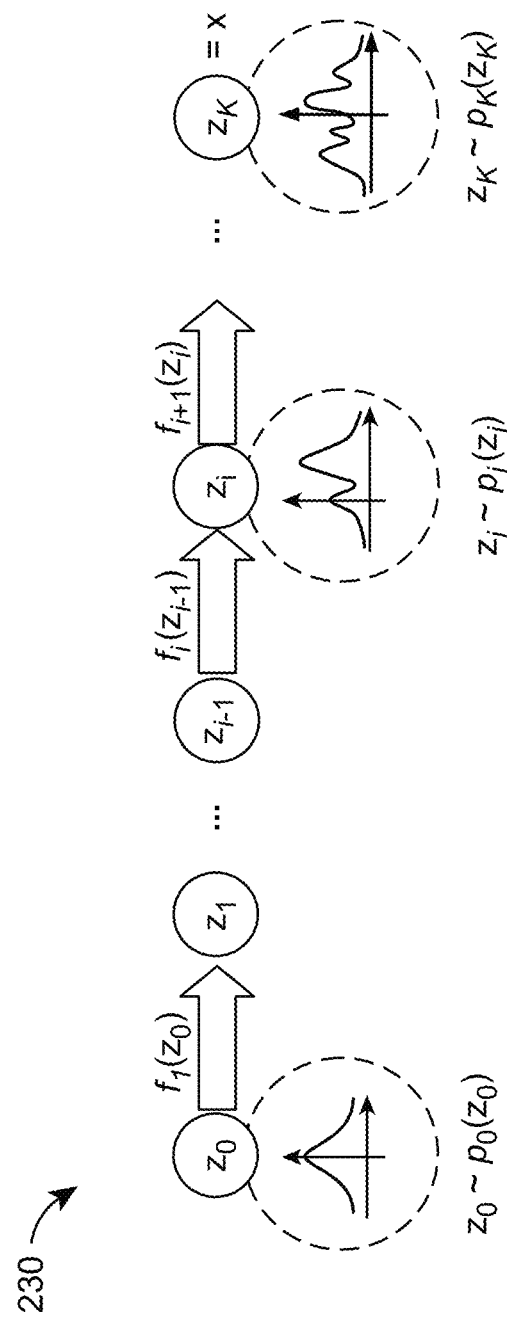
FIG. 2B is a diagram illustrating an example probability distribution of one or more latent representations associated with data of a scene, in accordance with some examples of the present disclosure.

FIG. 2A is a diagram illustrating an example normalizing flow model 200, in accordance with some examples of the present disclosure. Normalizing flow models, such as the example normalizing flow model 200, are a family of generative models that can be used for constructing flexible probability distributions over continuous random variables. For example, with reference to the diagram 230 illustrated in FIG. 2B, assume $x \in \mathbb{R}^D$ is a real vector (e.g., image pixels or RF signals). To define a joint distribution over x, the normalizing flow model 200 can express x as a transformation $f = f_1, \ldots, f_k$ of real vector z sampled from a base distribution $p_z(z)$: $x = f(z)$, where $z \sim p_z(z)$.

As previously described, the transformation f can be invertible (e.g., bijective) and both f and $f^{-1}$ can be differentiable. For example, with reference back to FIG. 2A, the normalizing flow model 200 can generate the probability distribution 220 from the image 210, and can generate the image 210 from the probability distribution 220.

In some examples, the transformation f can be implemented by a neural network. Such a transformation may need the z to be D-dimensional. Under such considerations, the probability density of x can be obtained using Equation 1 or Equation 2 previously described.

Figure 3A:
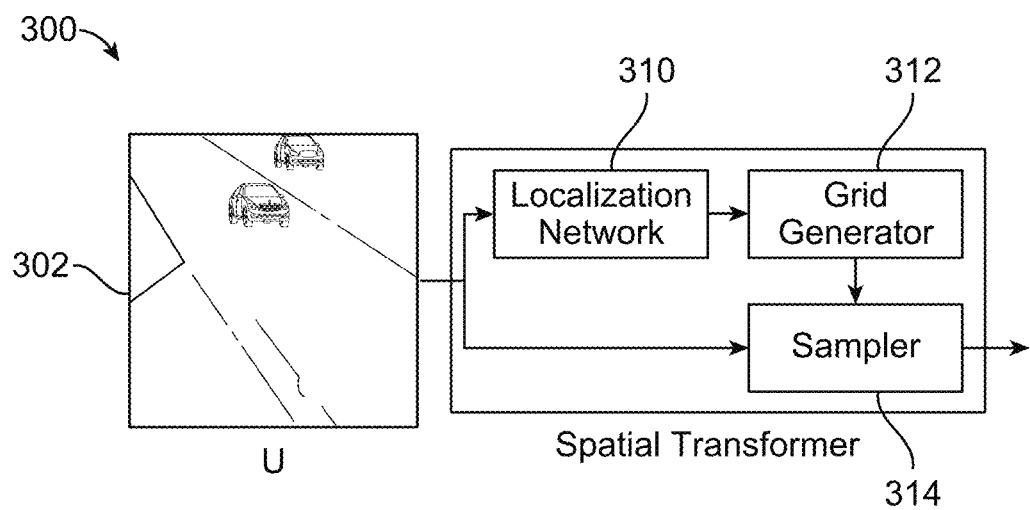
FIGS. 3A and 3B are diagrams illustrating example spatial transformer networks, in accordance with some examples of the present disclosure.

FIG. 3A is a diagram illustrating an example spatial transformer (ST) network 300, in accordance with some examples of the present disclosure. The ST network 300 can provide an adaptive way for spatial sampling from input data 302. The input data 302 can include, for example, an image U or multiple images. In some cases, the ST network 300 can include a localization network 310, a grid generator 312, and a sampler 314. In other cases, the ST network 300 may exclude the localization network 310. For example, with reference to FIG. 3B, the ST network 350 may exclude the localization network 310 shown in FIG. 3A, and may include the grid generator 312 and the sampler 314. As such, the ST network 350 can function as a sampler that is parametrized by an affine transformation ($\theta$).

Figure 3B:
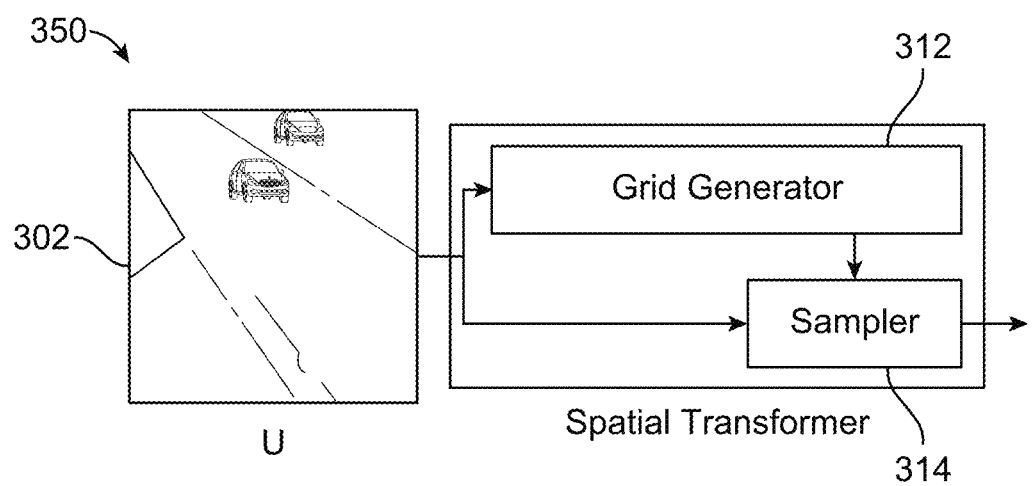

The ST network 300 shown in FIG. 3A or the ST network 350 shown in FIG. 3B can receive vectors, such as a scale vector (e.g., a size vector) and a position vector. Based on the vectors, the ST network 300 or the ST network 350 can sample a two-dimensional (2D) patch from the input data 302. As further explained below, in some cases, the ST network (e.g., ST network 300 or ST network 350) can be used to disentangle the "z" components of the objects in the scene depicted in the input data 302. In some examples, the ST network can be parametrized by an affine transformation ($\theta$) and can use the two vectors to sample a 2D patch from the input data 302, as shown below:

$$\begin{pmatrix} x_i^s \\ y_i^s \end{pmatrix} = \begin{pmatrix} \theta_{11} & \theta_{12} & \theta_{13} \\ \theta_{21} & \theta_{22} & \theta_{23} \\ \theta_{31} & \theta_{32} & \theta_{33} \end{pmatrix} \cdot \begin{pmatrix} x_i^t \\ y_i^t \end{pmatrix} \qquad \text{Equation (5)}$$

In some examples, the model can decompose the scene depicted in the input image (e.g., input data 302) into two components including a static component (e.g., the background) and a dynamic component (e.g., the foreground). The model can access a collection of sampled data from a scene and each sample can contain at least one object. The representation of objects in the input data makes it possible to separate the objects (e.g., with no severe occlusion). There is no theoretical limit on the number of objects in the scene. However, in some cases, physical presence of many objects can cause occlusions/interferences.

Figure 4:
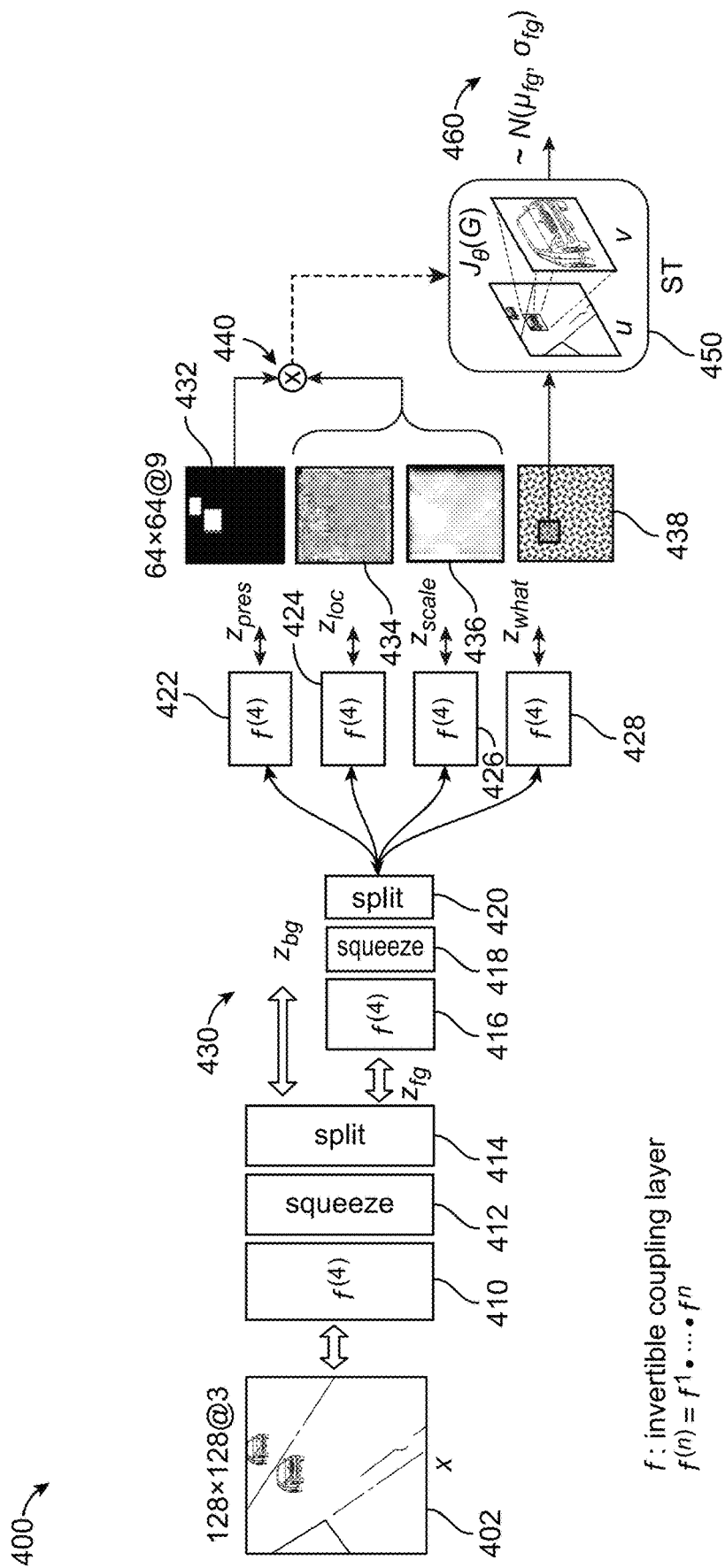
FIG. 4 is a diagram illustrating an example architecture of an example decompositional normalizing flow network, in accordance with some examples of the present disclosure.

FIG. 4 is a diagram illustrating an example architecture 400 of an example decompositional normalizing flow (DeNF) network. In some examples, the architecture 400 can include a mixture of flows between background ($z_{bg}$) and foreground ($z_{fg}$) components of a scene depicted in the input image 402. As shown, the architecture 400 of FIG. 4 can include invertible coupling layers 410, 416, 422, 424, 426, and 428, squeeze layers 412, 418, split layers 414, 428, a multiplier 440, and an ST network 450.

The invertible coupling layers 410 can include one or more invertible coupling layers. In the illustrative example of FIG. 4, the invertible coupling layers 410 include four invertible coupling layers (as represented by the "(4)" notation in $f^{(4)}$). However, in other examples, invertible coupling layers 410 may have only a single invertible coupling layer, fewer than four invertible coupling layers, or more than four invertible coupling layers.

The invertible coupling layers 410 can perform bijective/invertible functions (f) on the input (e.g., input image 402). In some examples, the invertible coupling layers 410 can process the input image 402 to generate an output (e.g., a transformation, a probability distribution, an invertible map, etc.) for the squeeze layer 412. In other examples, the invertible coupling layers 410 can process an output from the squeeze layer 412 to generate the image 402. In some cases, the invertible coupling layers 410 can use one or more planar coupling layers for invertible operations. In other examples, the invertible block can use other invertible neural implementations such as an invertible 1×1 convolution (e.g., a Generative Flow (Glow)) for invertible operations. In some examples, invertible coupling layers 410 can apply multiple transformation layers implemented by the coupling layers.

The squeeze layer 412 can reshape the tensor. In some examples, the squeeze layer 412 can reduce the spatial dimension of the tensor and increase the channels of the tensor. As previously explained, an example constrain of some models can be that the input and output should have the same dimension. The squeeze layer 412 can thus reduce the dimension of the tensor and increase the channels of the tensor. For example, if the size of the input to the squeeze layer 412 is 128×128 and includes 3 channels, the squeeze layer 412 can reduce the input to 64×64 with 12 channels, thereby reducing the dimension of the input and increasing the number of channels.

In some examples, the squeeze layer 412 can allow the split layer 414 to separate the background and the foreground in the input data. Moreover, the squeeze layer 412 can allow the number of channels of a signal to be increased (for example, if the number of latent spaces need to be increased, increasing the number of channels can allow for more latent spaces) while preserving the dimensionality of the signal. In some cases, the squeeze layer 412 can achieve a balance between the size of the signal (e.g., or the size reduction) and the number of channels (e.g., or the channel increase).

The split layer 414 can split the z vector (e.g., the latent space vector) into two partitions. The first partition can be identified as background components 430 (e.g., $z_{bg}$). The second partition includes a foreground component $z_{fg}$ representing one or more objects in the scene. As described below, the foreground component $z_{fg}$ can be further processed through deeper layers of the architecture 400 (e.g., the invertible coupling layers 416, the squeeze layer 418, the split layer 420, the invertible coupling layers 422, 424, 426, 428, etc.). In some examples, $z_{fg}$ can be considered as a structured variable. If the input to the network includes color images of size H×W×3, the foreground component $z_{fg}$ can have lower resolution due to the multi-scale architecture of the network. For example, in the network with two levels of squeezing, the foreground component $z_{fg}$ can be a feature map of size h×w×c, where $$h = \frac{1}{4}H \text{ and } w = \frac{1}{4}W.$$

In some cases, the split layer 414 can split the $z$ vector by cutting the vector. For example, the split layer 414 can cut the vector to yield 12 channels, and can assign 3 channels to the background components and 9 channels to the foreground components.

The background components can be factored out at a finer scale (e.g., in an earlier layer), $z_{bg} \in \mathbb{R}^n (n<d)$, can be Gaussianized $z_{bg} \sim N(0,1)$. The flow-based formulation allows for exact maximum likelihood learning. The forward Kullback-Leibler (KL) divergence between flow-based model $p_x(x; \theta)$ and a target distribution $p_x^*(x)$ can be written as described in Equation 4 above.

By having access to a set of training samples $\{x_n\}_{n=1}^N$ from $p_x^*(x)$, the expectation over $p_x^*(x)$ can be estimated by Monte Carlo. To estimate the background scene, the first term in the right-hand-side (RHS) of the Equation 3 (see above) can be equal to zero ($P_{z_{fg}}(z_{fg})=0$). In some examples, a forward reconstruction loss for the background components can be written as follows:

$$\mathcal{L}_{bg}^{forward}(\theta) \approx$$

$$\frac{1}{N}\Sigma_{n=1}^N \log P_{z_{bg}}(f_{bg}^{-1}(x_n)) + \log\left|\det J_{f_{bg}^{-1}}(x_n)\right| + const$$

Equation (6)

To evaluate Equation 6, the network can use a set of samples $\{x_n\}_{n=1}^N$ containing only the background scene. This may not always be feasible as, for all training sets, there may be at least one object in every sample from the scene. Thus, to constrain the network to only map the background features into background components 430 ($z_{bg}$), the network can minimize the backward flow by sampling $z_{bg} \sim N(0,1)$ and reconstructing the background. In some examples, the parameters $\theta$ can be optimized iteratively with a mini-batch gradient-decent process. By using a random batch selection and choosing even a small batch size (e.g., equal to 8), it is most likely that each individual pixel across the batch dimension will be sampled from the background at least once. Accordingly, in some examples, the network can implement a forward reconstruction loss for the background scene over batch samples (B) as follows:

$$\hat{z}_{bg} = z_{bg} + \epsilon \text{ where } \epsilon \sim N(0, \sigma_\epsilon)$$

Equation (7)

-continued $$\hat{x}_{bg} = f(\hat{z}_{bg}, z_{fg} = 0)$$

Equation (8)

$$\mathcal{L}_{bg}^{backward}(\theta) = \frac{1}{N}\Sigma_{n=1}^N \min_{\forall x^{(n)} \in B} \left\|x^{(n)} - \hat{x}_{bg}^{(n)}\right\|$$

Equation (9)

where O is a null tensor with all zero values and $x^{(n)}$ denotes the $n^{th}$ element of tensor x. In some examples, the background loss can be computed by aggregating the forward and backward flows as follows:

$$\mathcal{L}_{bg}(\theta) = \mathcal{L}_{bg}^{forward} + \mathcal{L}_{bg}^{backward}$$

Equation (10)

As noted above, after channel-wise splitting the feature map into two parts and assigning one part to the background $z_{bg}$ and the second part to foreground $z_{fg}$, the foreground part $z_{fg}$ can be further transformed through the coupling layers 416. The invertible coupling layers 416 can include one or more invertible coupling layers. In the illustrative example of FIG. 4, the invertible coupling layers 416 include four invertible coupling layers. However, in other examples, invertible coupling layers 416 can include a single invertible coupling layer, less than four invertible coupling layers, or more than four invertible coupling layers.

In some examples, the output from the invertible coupling layers 416 can be processed by another squeeze layer 418. The squeeze layer 418 can further split the channels of the input signal to ensure it has enough channels to represent the complexity of the color and texture of the image data. In some examples, such attributes can include scale (e.g., size), location, a displacement, appearance, color, and/or any other attributes. For example, the squeeze layer 418 can split the signal into enough channels to use 2 channels for the location of an object, 2 channels for the scale of the object, 2 channels for a displacement, and 3 or more channels for object attributes (e.g., color, appearance, etc.).

The split layer 420 can split the channels from the output of the squeeze layer 418 into a number of channels for a set of attributes such as, for example, object location, object scale, object attributes (e.g., color, appearance, etc.), displacement, etc. In some examples, the split layer 420 can split the channels from the output of the squeeze layer 418 into 2 channels for location, 2 channels for scale, 3 channels for object attributes (e.g., color, appearance, etc.), and 2 channels for a displacement vector. The resulting channels can be processed by the invertible coupling layers 422, 424, 426, 428. The invertible coupling layers 422, 424, 426, 428 can then generate feature maps 432, 434, 436, 438 for the various attributes (e.g., location, scale, displacement, object attributes, etc.). In some cases, each of the invertible coupling layers 422, 424, 426, 428 can include one or more invertible coupling layers. In the illustrative example of FIG. 4, each of the invertible coupling layers 422, 424, 426, and 428 includes fours invertible coupling layers. However, in other examples, each of the invertible coupling layers 422, 424, 426, and 428 may have only a single invertible coupling layer, fewer than four invertible coupling layers, or more than four invertible coupling layers.

A multiplier 440 can multiply the feature maps 432, 434, and 436, and feed the output to the spatial transformer network 450. The spatial transformer network 450 can use the output from the multiplier 440 and the feature map 438 to generate an output 460.

As previously mentioned, in some examples of the foreground generative flow, if the input to the network includes color images of size H×W×3, the foreground component $z_{fg}$ can have lower resolution due to the multi-scale architecture of the network. For example, in the network with two levels of squeezing, the foreground component $z_{fg}$ can be a feature map of size h×w×c, where $$h = \frac{1}{4}H \text{ and } w = \frac{1}{4}W.$$

Each cell with indices (i,j), i∈{0, ..., h−1}, j∈{0, ..., w−1} and length of c in the map of size h×w can be associated with a set of ($z_{pres}$, $z_{where}$, $z_{what}$) variables. The $z_{pres}$∈{0,1} variable represents whether an object exist in the cell or not. The $z_{where}$∈ $\mathbb{R}^4$ variable represents a 2D displacement vector to the closest object in the scene and the object's scale. The $z_{what}$ ∈ $\mathbb{R}^{4c-5}$ variable represents other object attributes such as, for example, appearance, color, and/or any other object attributes. In some examples, the flow-based decompositional normalizing flow model can impose base-distributions to each of these variables.

In some examples, the binary $z_{pres}$ can be modeled by a Bernoulli distribution using the Gumbel-Softmax $z_{pres}^{ij}$~RelaxedBernoulli($\beta_{pres}^{ij}$). Concrete distribution with a relaxation of categorical distribution, based on the Gumbel-Softmax trick, can make the base distribution differentiable in the training time. In some examples, the sampling procedure for $z_{pres}^{ij}$ can be described as follows:

$$z_{pres}^{ij} = \frac{1}{1 + \exp - \frac{\log \alpha + L}{\lambda}} \quad \text{Equation (11)}$$

where L=log U−log(1−U) and U~Uniform(0,1). The $\lambda$∈(0, ∞) is the temperature parameter that controls the degree of approximation. As $\lambda \to 0$, the $z_{pres}^{ij}$ converges to Bernoulii with parameter $$\frac{\alpha}{1+\alpha}.$$

The $z_{where}$ can be further decomposed to location $z_{loc}$∈ $\mathbb{R}^2$ and scale $z_{scale}$ ∈ $\mathbb{R}^2$ and both would have a Gaussian base distribution (e.g., $z_{loc}$∈~N($\mu_{loc}$, $\sigma_{loc}$)) and $z_{scale}$~N($\mu_{scale}$, $\sigma_{scale}$) A bimodal Gaussian distribution can be assigned to $z_{what}$ as it represents the attributes of each cell depending on whether it belongs to the background or foreground. Depending on whether the cell (i,j) contains an object or not, it can be sampled from one of two Gaussian distributions with different mean values as follows:

$$z_{what} \sim \begin{cases} N(\mu_{fg}, \sigma_{fg}), & \text{if } z_{pres} = 1 \\ N(\mu_{bg}, \sigma_{bg}), & \text{otherwise} \end{cases} \quad \text{Equation (12)}$$

To disentangle these components, the value of $z_{where}^{ij}$ where is used to control a spatial transformer T to extract a glimpse from the $z_{what}$ for the cell (i,j) with $z_{pres}^{ij}$=1. The values of sampled glimpses are compared with $z_{what}$~N(fg, $\sigma_{fg}$) and the $z_{what}$ of other cells are compared with N($\mu_{bg}$, $\sigma_{bg}$). The base distribution on the foreground components $z_{fg}$ can be defined as:

$$p(z_{fg}) = \prod_{ij} p(z_{pres}^{ij})(p(z_{where}^{ij})p(z_{what}^{ij}))^{p_{pres}^{ij}} \quad \text{Equation (13)}$$

Consequently, log p($z_{fg}$) can be defined as:

$$\log p(z_{fg}) = \sum_{ij}[\log p(z_{pres}^{ij}) + p(z_{pres}^{ij})(\log p(z_{where}^{ij}) + \log p(z_{what}^{ij}))] \quad \text{Equation (14)}$$

Considering only the foreground components ($p_{z_{bg}}$=0) in Equation 3, the network can compute the foreground loss. By having access to the data samples $\{x_n\}_{n=1}^N$, similar to what was shown before in Equation 6, the network can compute the Kullback-Leibler (KL) divergence for the foreground $\mathcal{L}_{fg}(\theta)$ by replacing Equation 14 and the Jacobian of the foreground mapping.

The network allows for exact likelihood estimation over $z_{bg}$ and $z_{fg}$ variables. Minimizing the derived $\mathcal{L}_{bg}(\theta)$ and $\mathcal{L}_{fg}(\theta)$ yields a generative-model for the scene data. However, the components of the foreground (e. g., $z_{pres}$, $z_{where}$, $z_{what}$) may not be disentangled. To disentangle the foreground components, the network can define a compatibility and reconstruction losses.

In some examples, with respect to the compatibility loss, the vector of $z_{where}$ can indicate the offset of the central location of the closest object to the cell (i,j). Therefore, creating a binary mask by using $z_{where}^{ij}$ for all cells with $z_{pres}^{ij}$=1 can resemble the binary $z_{pres}$ map of size h×w. To construct the binary mask, the network can again use the ST network 450. For the cell (i,j) belonging to foreground $z_{pres}^{ij}$=1, the ST network 450 can use the $z_{where}^{ij}$ to render a 2D box of predefined size (e.g., 8×8), containing unity values in a map of size h×w. The ST network 450 can apply a transition and scale to the 2D box and can render a map with all zero values of size h×w. The constructed maps for all (i,j) cells can be superimposed and the values can be truncated to be in the range of [0,1]. The superimposed mask (M) can be compared with the map $z_{pres}$ to minimize the difference as follows:

$$\mathcal{L}_{com}(\theta) = \frac{\sum_{ij}(M^{ij} - z_{pres}^{ij})^2}{\sum_{ij}M^{ij} + \sum_{ij}z_{pres}^{ij}} \quad \text{Equation (15)}$$

In some examples, with respect to the reconstruction loss, the network can compute the reconstruction loss by mixing the background and foreground flows as follows:

$$\hat{x}_{bg} = f_\theta(z_{bg}, z_{fg}=0) \quad \text{Equation (16)}$$

$$\hat{x}_{fg} = f_\theta(z_{pres}, z_{where}, z_{pres} \circ z_{what}, z_{bg}=O) \quad \text{Equation (17)}$$

$$\hat{x} = z_{pres} \cdot \hat{x}_{fg} + (1 - z_{pres}) \cdot \hat{x}_{bg} \quad \text{Equation (18)}$$

$$\mathcal{L}_{rec}(\theta) = \|x - \hat{x}\|_2^2 \quad \text{Equation (19)}$$

where O is a tensor with all zero entries and ∘ denotes the Hadamard product. The total training loss is the summation of forward and backward losses as follows:

$$\mathcal{L}_{total}(\theta) = \mathcal{L}_{bg} + \mathcal{L}_{fg} + \mathcal{L}_{comp} + \mathcal{L}_{rec} \quad \text{Equation (20)}$$

In some cases, the network can perform scene reconstruction with a single object detected in the input image 402. In some examples, after training the network, the scene can be reconstructed by preserving only one specific object by masking the other objects. In the inference stage, the $z_{where}$ vector of each cell that contains object $z_{pres}$=1, represents a bounding box in the scene. To detect how many objects are in the scene, the network can apply a nonmaximum suppression on all detected bounding boxes to have a single bounding box per object. To mask other objects, the network can construct a binary mask that is the same as $z_{pres}$ only inside the object bounding box and zero elsewhere. By mixing the $x_{bg}$ and $x_{fg}$ in a manner similar to what is shown in Equations 16-19, the scene preserving a single object can be reconstructed.

Figure 5:
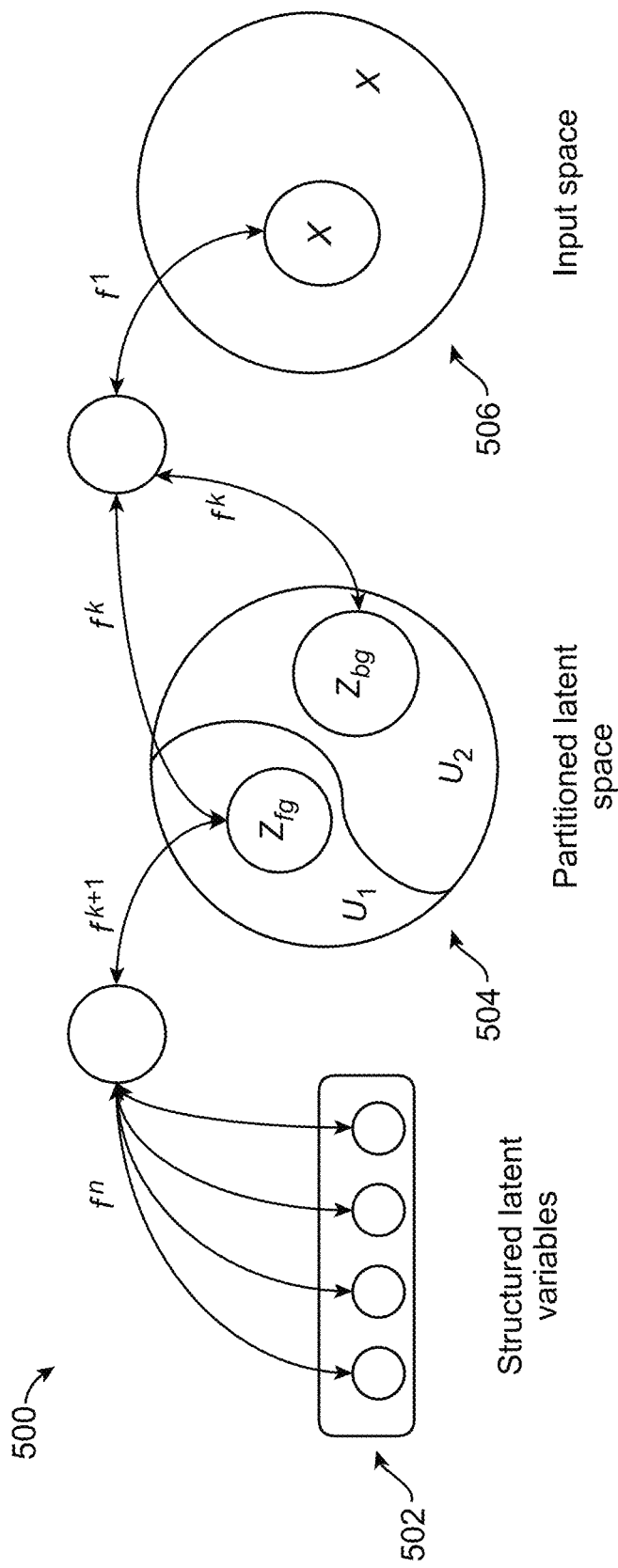
FIG. 5 illustrates an example distribution of scene data as a mixture of flows, in accordance with some examples of the present disclosure.

In some examples, the network can learn the distribution of scene data as a mixture of flows. FIG. 5 is a diagram illustrating an example distribution 500 of scene data as a mixture of flows. In some examples, a mixture of flows (e.g., bijective mappings) can generate the scene image (x) from a set of latent variables 502. The latent space 506 of the model can be partitioned into a partitioned latent space 504 that includes foreground ($z_{fg}$) and background ($z_{bg}$) components that generate non-overlapping regions of the image. The foreground can be further decomposed into structured latent variables that represent the objects.

In some cases, the network can assume that the scene can be decomposed into background and foreground components. In some cases, the data distribution through a flow-based model can be decomposed as follows:

$$\log p_\theta(x) = \log p_z(z) + \log \left|\det\left(\frac{\partial f_\theta^{-1}(x)}{\partial x}\right)\right| \quad \text{Equation (21)}$$

$$p_x(x) = \Sigma_{i \in I} p_z(f_i^{-1}(x)) |\det J_{f_i^{-1}}(x)| \quad \text{Equation (22)}$$

$$= p_{z_{fg}}(f_{fg}^{-1}(x)) |\det J_{f_{fg}^{-1}}(x)| +$$

$$p_{z_{bg}}(f_{bg}^{-1}(x)) |\det J_{f_{bg}^{-1}}(x)|$$

Figure 6:
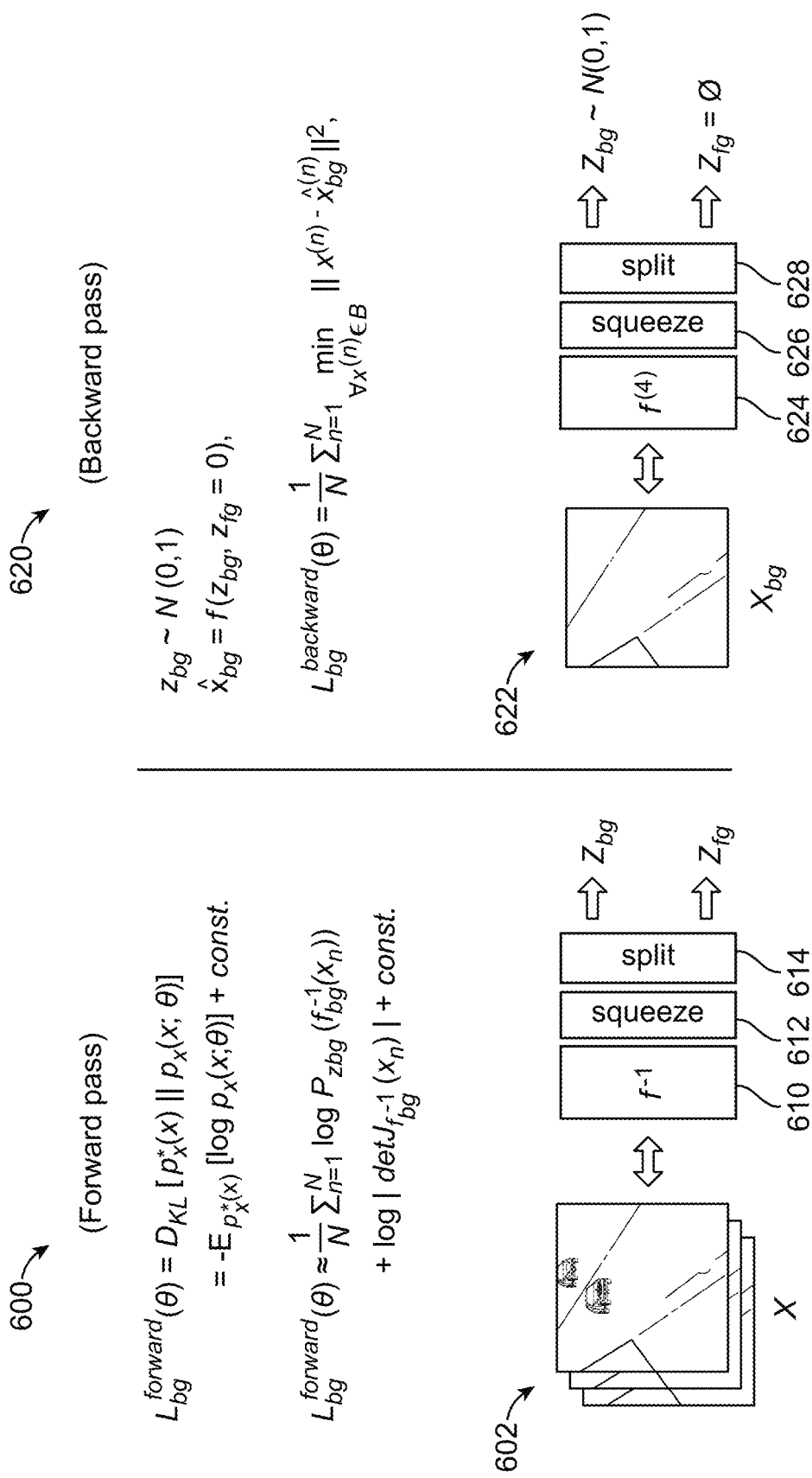
FIG. 6 is a diagram illustrating a forward pass and a backward pass performed by a decompositional normalizing flow network to learn a scene background in a scene depicted in image data, in accordance with some examples of the present disclosure.

FIG. 6 is a diagram illustrating a forward pass 600 and a backward pass 620 performed by a decompositional normalizing flow network to learn the scene background in a scene depicted in image data. In the forward pass 600, the invertible coupling layers 610 (denoted as $f^{-1}$ representing an inverse operation used for the forward pass 600) can map the input image data 602 x into two latent components: $x \to \{z_{fg}, z_{bg}\}$. The forward pass 600 can implement a squeeze layer 612 to reduce the dimension of the input data and increase the number of channels as previously explained. The split layer 614 can then split the channels for the background and foreground components. In some examples, the forward pass 600 can implement Equation 4 and/or Equation 6 above to determine the target distribution.

The backward pass 620 can process the background components and foreground components to generate a background image 622 without the objects in the scene. The background pass 620 can process the background and foreground components through the split layer 628, the squeeze layer 626, and the invertible coupling layers 624.

In some examples, the backward pass 620 can implement Equations 7, 8, and 9 to determine the target distribution for background components. In some examples, the base distribution for background components can be a gaussian distribution ($z_{bg} \sim N(0,1)$). The background components can be learnt by minimizing a bidirectional training loss as follows:

$$\mathcal{L}_{bg}(\theta) = \mathcal{L}_{bg}^{forward} + \mathcal{L}_{bg}^{backward} \quad \text{Equation (23)}$$

Figure 7:
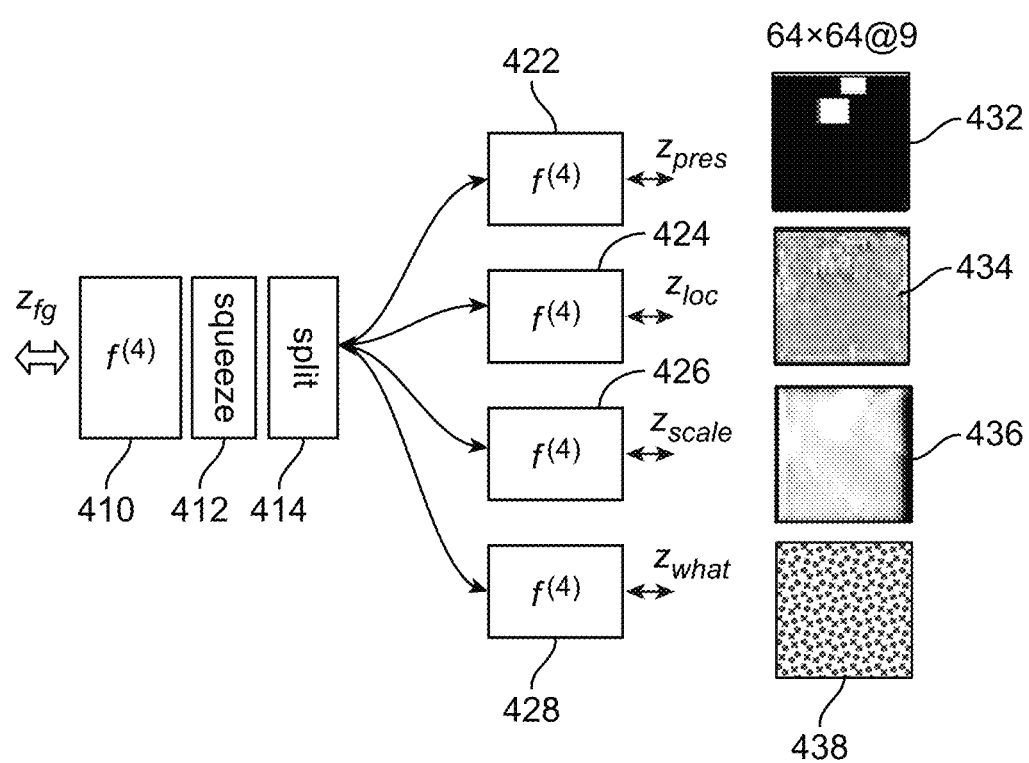
FIG. 7 is a diagram illustrating an example portion of a decompositional normalizing flow network used to learn the scene foreground in the input image data, in accordance with some examples of the present disclosure.

FIG. 7 is a diagram illustrating an example of the portion of the decompositional normalizing flow network architecture 400 of FIG. 4 described above for learning the scene foreground in the input image data. The decompositional normalizing flow network can implement the invertible coupling layers 410, the squeeze layer 412, the split layer 414, and the invertible layers 422 through 428, as previously described with respect to the architecture 400 of FIG. 4. The invertible layers 422 through 428 can generate the output feature maps 432 through 438 as previously explained with respect to the architecture 400 of FIG. 4.

For example, the decompositional normalizing flow network can factorize the foreground components ($z_{fg}$) into latent components ($Z_{pres}$, $Z_{scale}$, $Z_{loc}$, $z_{what}$) in the deeper layers of the network. In some cases, the decompositional normalizing flow network can partition the foreground and background components as follows:

$$p(x|z_{fg}, z_{bg}) = p(z_{pres}) \cdot p(x|z_{fg}) + (1 - p(z_{pres})) \cdot p(x|z_{bg}) \quad \text{Equation (24)}$$

In some examples, the term $p(x|z_{fg})$ in Equation 24 can represent the foreground distribution and the term $p(x|z_{bg})$ in Equation 24 can represent the background distribution. In some cases, the distribution on the foreground components $z_{fg}$ can be defined as follows:

$$p(z_{fg}) = \prod_{i=1}^{H \times W} p(z_i^{pres}) \cdot [p(z_i^{loc}) \cdot p(z_i^{scale}) \cdot p(z_i^{what})]^{z_i^{pres}} \quad \text{Equation (25)}$$

The binary $z_{pres}$ can be modeled as follows $z_i^{pres} \sim$ Bernoulli. In some cases, the background components can be Gaussianized as follows: $z_{bg} \sim N(0,1)$. The latent components can have a distribution as follows:

$$z_i^{scale} \sim N(0.2, 0.1) \gg \text{The output map is in } \frac{1}{4} \text{ scale} \quad \text{Equation (26)}$$

$$z_i^{loc} \sim N(0, 1.0) \gg \text{Relative to } i^{th} \text{ cell position}$$

$$z_i^{what} \sim \begin{cases} N(1, .5) & \text{if } z_{obj} = 1 \\ N(0, .5) & \text{if } z_{obj} = 0 \end{cases}$$

The binary $z_{pres}$ map partitions the scene into 2 groups. Accordingly, mixing these two groups can reconstruct the input data. The network can compute the reconstruction loss by mixing the background and foreground flows as illustrated in Equations 16-19 above.

Figure 8:
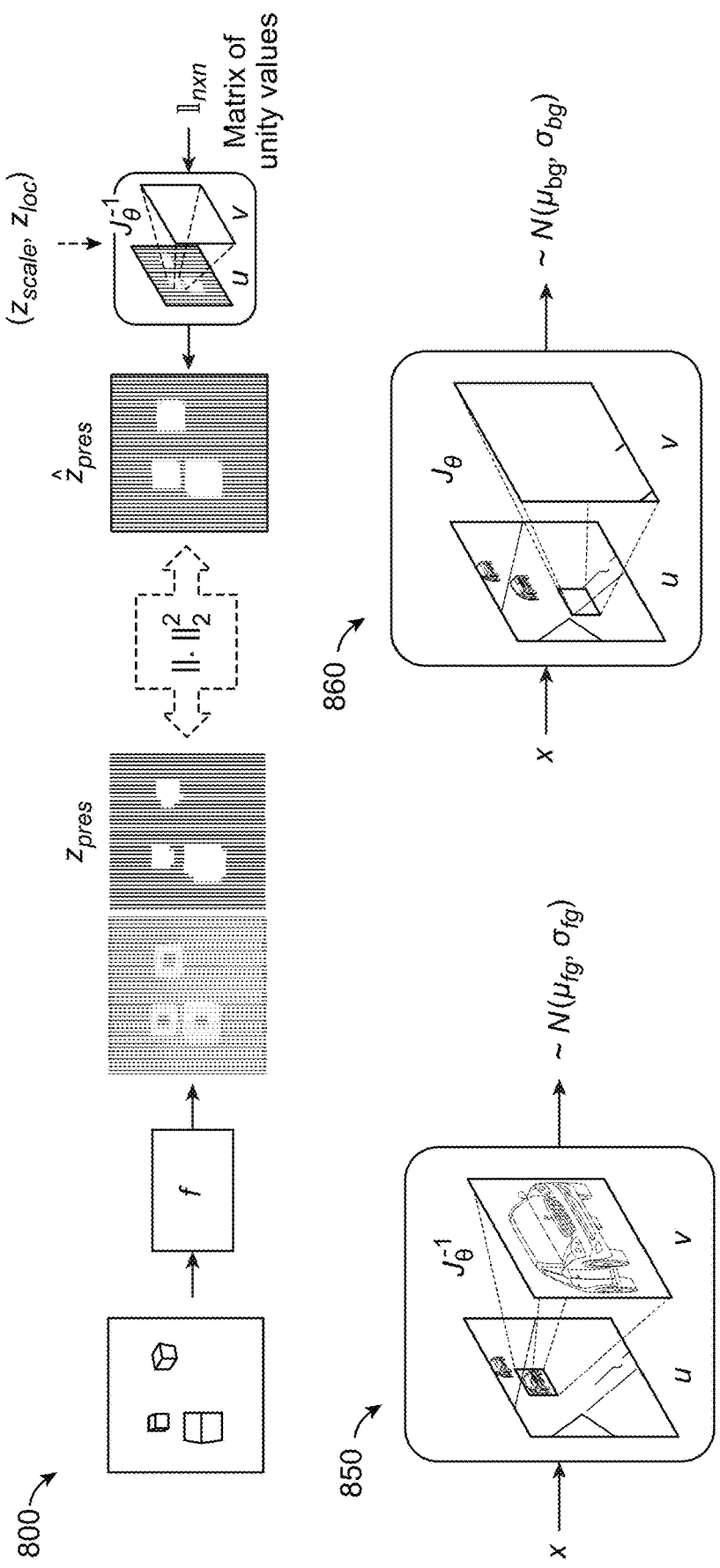
FIG. 8 is a diagram illustrating example flows for learning the size and location of an object and implementing a spatial transformer network to constrain the size and location components to represent size and location semantics and imposing a different distribution on the object attributes, in accordance with some examples of the present disclosure.

FIG. 8 is a diagram illustrating example flows 800, 850, and 860 for learning the size and location of an object in an image, implementing an ST network to constrain the size and location components to represent size and location semantics, and imposing a different distribution on the object attributes. The size and location of the object can be learned and disentangled via $z_{scale}$ and $z_{loc}$. The ST network can constraint these two components (e.g., the size and location components) to represent such semantics, as shown in flow 800, and impose a different distribution on the $z_{what}$ components, as shown in flow 850 and the flow 860.

In some examples, the decompositional normalizing flow network can penalize non-overlapped detections. In some cases, to constraint the network to prevent it from splitting boxes into smaller ones that cover the foreground but to be close to the convex hull of objects, the network can maximize the intersection over union metric between boxes in the scene as follows: $\mathcal{L}_{iou} = \Sigma_{i \neq j} \min(1.0 - I_{ij}, I_{ij})$, where $I_{ij}$ denotes intersection over union of $i^{th}$ and $j^{th}$ box.

The network can compute the total loss as follows: $\mathcal{L}_{NLL} = KL(z_{obj}, Z_{prior}) + NLL(z, z_{prior})$, where $z \in \{z_{scale}, Z_{where}, Z_{what}\}$. The network can also compute an optimization loss as follows: $\mathcal{L} = \mathcal{L}_{bg} + \mathcal{L}_{rec} + \mathcal{L}_{NLL} + \mathcal{L}_{iou}$.

Figure 9:
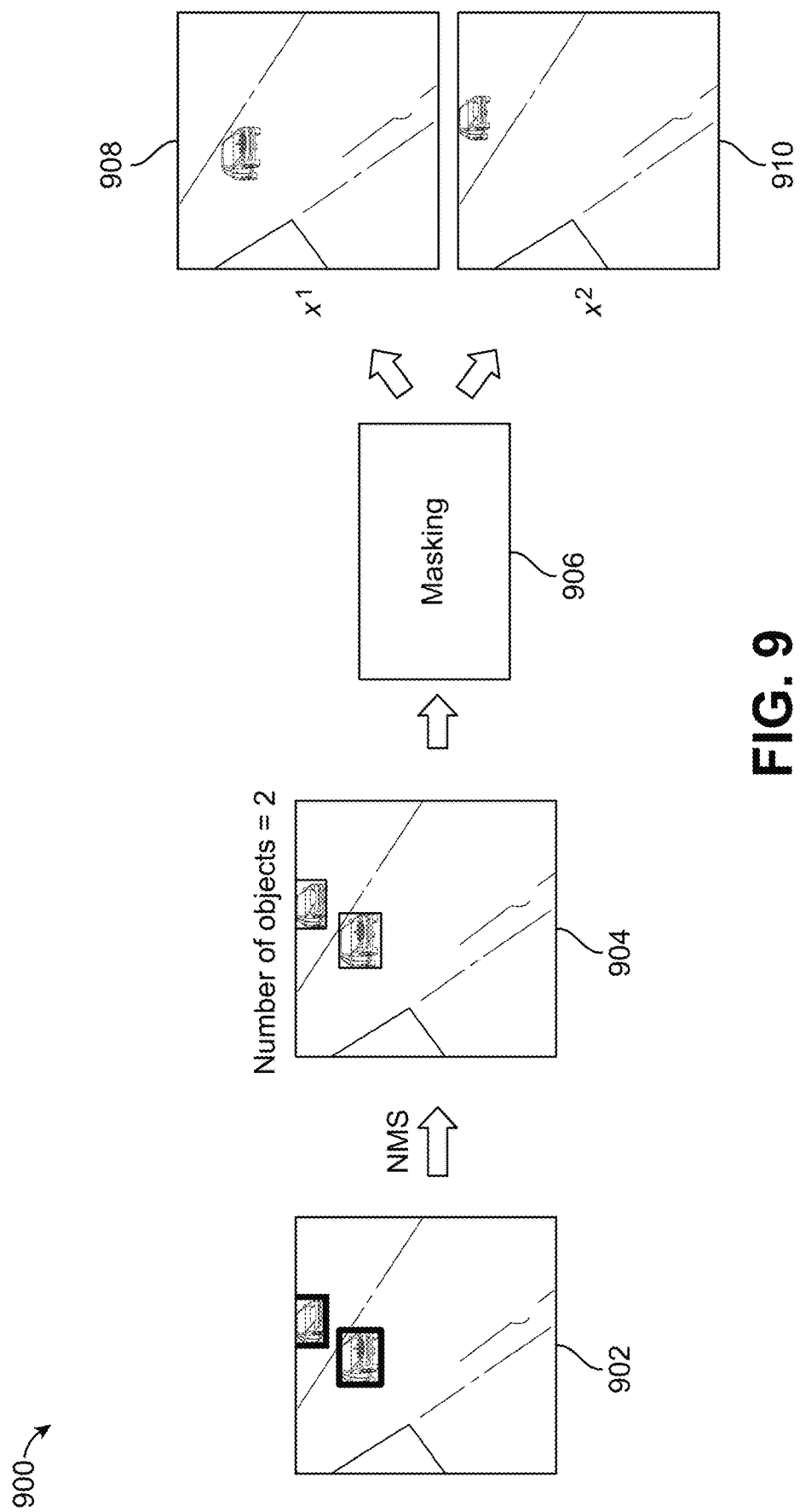
FIG. 9 is a diagram illustrating an example flow for generating a scene with a single object based on an input image that includes multiple objects in the scene, in accordance with some examples of the present disclosure.

FIG. 9 is a diagram illustrating an example flow 900 for generating a scene with a single object based on an input image that depicts the scene with multiple objects in the scene. Since the network may find multiple overlapped detections for each object, the network can process an input image 902 of the scene, and determine a non-maximum suppression (NMS). The network can generate an image 904 with aggregated detections. In some examples, the network can use the NMS to aggregate the detections.

The network can apply masking 906 to the image 904 to generate an image 908 of the scene with one of the detected objects and an image 910 of the scene with the other detected object. In some examples, the network can apply the masking 906 as follows: $M^i = Z_{mask}^i \odot Z_{obj}$ and $x^i = M^i \cdot x_{fg} + (1-M^i) \cdot x_{bg}$.

The decomposition techniques described herein can be implemented in a variety of use cases. In some examples, the decomposition described herein can be implemented to perform multi-person passive WIFI localization.

Certain unsupervised techniques for person (and/or object) localization in passive Wi-Fi signals can be based on a number of assumptions. One example assumption can include an assumption that only one moving target exists in the scene. Moreover, extending passive Wi-Fi localization methods (e.g., OT-IsoMap or WiCluster) to support multi-person scenarios can be difficult. Such difficulty can be at least partly a result of because of the learning mechanisms of the localization methods such as, for example, manifold learning or deep metric learning mechanisms as previously described.

In some aspects, to support multi-person (or multi-object) cases/scenarios, the decompositional normalizing flow network can decompose the input signal into multiple instances. The localization algorithm(s) can then be applied on each instance individually. The decompositional normalizing flow network can then aggregate the individual predictions.

In other examples, the decomposition described herein can be implemented to generate multi-object representations. Data representation with multiple objects can be challenging because of combinatorial possibilities of attributes such as, for example, the location, size, and/or appearance of the objects in the scene. The challenges can apply to manifold learning and deep metric learning methods that assume the pattern of only one entity exists in each input sample. However, the decompositional normalizing flow network described herein can address multi-object analysis even if the process only supports single object analysis.

FIG. 10 illustrates decomposition and object representation results generated based on an image dataset 1000 that includes multiple objects depicted in a scene. In FIG. 10, the row 1002 shows the original images, the row 1004 shows detected bounding boxes, the row 1006 shows the segmented foreground, the row 1008 shows binary masks, the row 1010 shows scale maps of objects, the row 1012 shows norms of shift vectors, and the row 1014 shows the generated background.

The image dataset 1000 can be based on any datasets. In the illustrative example shown in FIG. 10, the image dataset 1000 is based on the compositional language and elementary visual reasoning (CLEVR) dataset (Johnson et al., 2017) containing 70,000 training images with a resolution of 240×320 pixels, which were scaled to 128×128 pixels. Each scene depicted in the image dataset 1000 can contain multiple objects characterized in terms of shape (e.g., cube, cylinder, sphere, etc.), size (e.g., small, large, etc.), material (e.g., rubber, metal, etc.), color (e.g., a number of different colors such as, for example, 8 different colors), position (e.g., continuous), and rotation (e.g., continuous). For example, in some cases, each scene depicted in the image dataset 1000 can contain between three and ten objects, characterized in terms of shape, size, material, color, position, and rotation. The training set, referred to herein as CLEVR6, includes a subset of images containing 1-6 objects (inclusive). Unless noted otherwise, the evaluation of models described herein is based on the full CLEVR distribution containing 3-10 objects. All references to CLEVR herein refer to the full distribution.

Table 1020 (Table 1) in FIG. 10 also shows the average foreground adjusted random index (ARI) on the image dataset 1000 (in %, mean±standard deviation across different runs, the higher the better) using the decompositional normalizing flow (DeNF) model described herein, as compared with values reported in the literature. For example, table 1020 shows the average foreground ARI based on the DeNF model described herein, as well as the average foreground ARI values generated using the IODINE (Greff et al., 2019) method, the MONet (Burgess et al., 2019) method, the Slot Att. (Locatello et al., 2020) method, the ObSuRF (Stelzner et al., 2021) method, and the Sprites (Monnier et al., 2021) method.

FIG. 11 illustrates decomposition and scene representation results on traffic image data. The decomposition and scene representation results illustrate the original images 1102, detected bounding boxes 1104, segmented backgrounds 1106, norms of shift vectors 1108, binary masks 1110, and scale maps of objects 1112. The real traffic dataset contains five hours of footage of a busy street intersection, divided into fragments containing from one to six cars.

As shown, the input scene 1120 depicting multiple objects (e.g., vehicles) has been decomposed into scenes 1130 and 1132 with each of the scenes 1130 and 1132 depicting one of the multiple objects in the input scene 1120. Similarly, the input scene 1122 depicting multiple objects has been decomposed into scenes 1134 and 1136 with each of the scenes 1134 and 1136 depicting one of the multiple objects in the input scene 1122, the input scene 1124 depicting multiple objects has been decomposed into scenes 1138 through 1144 with each of the scenes 1138 through 1144 depicting one of the multiple objects in the input scene 1124, the input scene 1126 depicting multiple objects has been decomposed into scenes 1146 through 154 with each of the scenes 1146 through 154 depicting one of the multiple objects in the input scene 1126, and the input scene 1128 depicting a single object has been used to generate the scene 1156 depicting the object in the input scene 1128.

Figure 12:
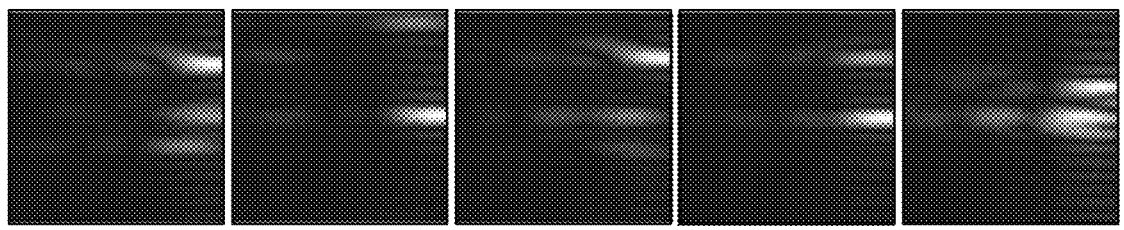
FIG. 12 is a diagram illustrating an example Wi-Fi spectrogram when two people are walking, in accordance with some examples of the present disclosure.

FIG. 12 is a diagram illustrating an example Wi-Fi spectrogram 1200 when two people are walking, according to some examples of the present disclosure. The decompositional normalizing flow network described herein can be used for scene decomposition based on RF sensory inputs. This can be in part due to a lack of assumption about the input data representation in the model. Decomposing the Wi-Fi spectrogram 1200 using the decompositional normalizing flow network can enable localization of more than one person in the environment by using existing single-person localization methods in an unsupervised setting.

The synthetic Wi-Fi signal associated with the Wi-Fi spectrogram 1200 was generated by simulating an indoor two-dimensional (2D) environment which has been confined with walls. The propagated Wi-Fi signal from the transmitter was measured. The measured signal conveys the geometric information of the scene used for scene decomposition. The Pylayers library was used to simulate the propagation of the Wi-Fi signal in a large room. The input channel state information (CSI) can be transformed to the Fourier domain and the spectrogram of the signal can be computed.

FIG. 13 is a flowchart illustrating an example process 1300 for scene decomposition. In some aspects, the process 1300 can include obtaining, accessing, or generating a scene-decompositional model (e.g., trained using unsupervised training) having a normalizing flow neural network architecture. In some examples, the scene-decompositional model can include the decompositional normalizing flow network shown in FIG. 4.

At block 1302, the process 1300 can include determining, based on data depicting multiple targets in a scene, a distribution of scene data as a mixture of flows from one or more background components and one or more foreground components. In some examples, the distribution of the scene data can be determined using a scene-decompositional model having a normalizing flow neural network architecture. In some aspects, the scene-decompositional model is trained using unsupervised training) In some cases, the multiple targets can include at least one object and/or at least one person. In some cases, the data can include at least one of an image and/or a spectrogram of a radio frequency signal.

At block 1304, the process 1300 can include processing the distribution of scene data using the scene-decompositional model. At block 1306, the process 1300 can include identifying, based on the processing of the distribution of the scene data using the scene-decompositional model, a target associated with the one or more foreground components and included in the data depicting the multiple targets in the scene. In some cases, identifying the target can include decomposing the scene into a background representation corresponding to a background of the scene and a respective representation of each target from multiple targets depicted in the data. At block 1308, the process 1300 can include outputting a representation of the target. In one illustrative example, the representation of the target may include a representation (e.g., a bounding box or other type of bounding region) of a location of the target in an output image. For instance, the process 1300 may output (e.g., display or output for display by a display) the output image with a bounding box or other representation of the location of the target in the output image.

In some aspects, the process 1300 can include identifying, based on processing the distribution of the scene data using the scene-decompositional model, a background of the scene associated with the one or more background components and included in the data depicting the multiple targets in the scene.

In some examples, the scene-decompositional model can include a first set of invertible learning blocks, a first squeeze layer, a first split layer, a second set of invertible learning blocks, a second squeeze layer, a second split layer, and a spatial transformer network. An illustrative example of such an architecture is provided in FIG. 4. In some cases, each invertible learning block implements one or more bijective functions. In some examples, each squeeze layer is configured to reshape an input tensor and reduce a spatial dimension of input data processed by each squeeze layer. In some cases, each squeeze layer is configured to reduce a dimension of input data processed by the squeeze layer and increase a number of channels of the input data. In some examples, the first split layer is configured to partition an output from the first squeeze layer into a latent representation of a background of the scene and a latent representation of a target from the multiple targets. In some cases, the first split layer is configured to separate an output from the first squeeze layer into a latent representation of a background of the scene and a latent representation of a target from the multiple targets.

In some cases, the second split layer is configured to slice a received tensor from its input layer of the network channel-wise. In some cases, the second split layer is configured to split a first set of channels associated with data processed by the second split layer into a second set of channels. In some examples, a set of partitioned channels can include one or more channels corresponding to a latent representation of object location variables, one or more channels corresponding to a latent representation of object size variables, and/or one or more channels corresponding to a latent representation of object attribute variables. In some cases, the object attribute variables can include at least one of color variables and/or appearance variables.

In some cases, the spatial transformer network is configured to perform spatial sampling from a patch of data based on scale latent variables and/or position latent variables. In some examples, the first set of invertible learning blocks is configured to map an input image into the one or more background components and the one or more foreground components.

In some aspects, the process 1300 can include reconstructing the data depicting the multiple targets in the scene based on a binary map that partitions the scene into a foreground and a background. In some aspects, the process 1300 can include separating respective representations of the multiple targets depicted in the data depicting the multiple targets in the scene.

In some cases, at least one of the multiple targets depicted in the data includes a person. In some examples, identifying the target can include localizing the person in the data depicting the multiple targets in the scene.

In some examples, the processes described herein (e.g., process 1300 and/or any other process described herein) may be performed by a computing device or apparatus. In one example, the process 1300 can be performed by the electronic device 100 of FIG. 1. In another example, the process 1300 can be performed by the computing system having the computing system 1400 shown in FIG. 14. For instance, a computing device with the computing system 1400 shown in FIG. 14 can implement the operations of FIG. 13 and/or the components and/or operations described herein with respect to any of FIGS. 1 through 13.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 1300 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1300 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
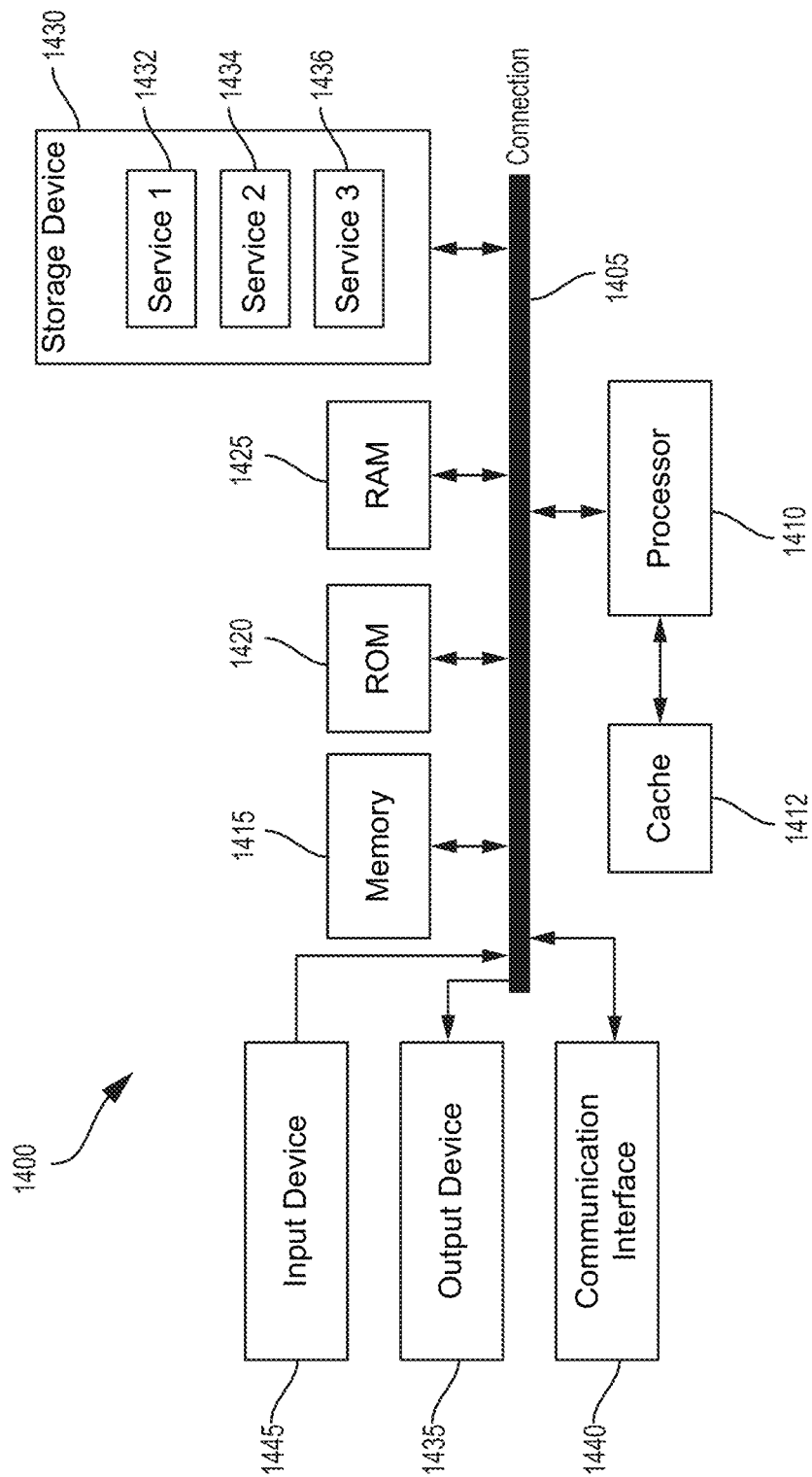
FIG. 14 is a diagram illustrating an example system architecture for implementing certain aspects described herein.

FIG. 14 is a diagram illustrating an example of a system for implementing certain aspects of the present technology. In particular, FIG. 14 illustrates an example of computing system 1400, which can be for example any computing device making up a computing system, a camera system, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some examples, computing system 1400 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 14314 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1402.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some examples, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1: An apparatus for processing data, the apparatus comprising: at least one memory; and at least one processor coupled to the at least one memory, the at least one processor being configured to: determine, based on data depicting multiple targets in a scene, a distribution of scene data as a mixture of flows from one or more background components and one or more foreground components, the distribution of scene data being determined using a scene-decompositional model having a normalizing flow neural network architecture; process the distribution of scene data using the scene-decompositional model; and identify, based on the processing of the distribution of the scene data using the scene-decompositional model, a target associated with the one or more foreground components and included in the data depicting the multiple targets in the scene; and output a representation of the target.

Aspect 2: The apparatus of Aspect 1, wherein the at least one processor is configured to: identify, based on processing the distribution of the scene data using the scene-decompositional model, a background of the scene associated with the one or more background components and included in the data depicting the multiple targets in the scene.

Aspect 3: The apparatus of any one of Aspects 1 or 2, wherein, to identify the target, the at least one processor is configured to: decompose the scene into a background representation corresponding to a background of the scene and a respective representation of each target from the multiple targets.

Aspect 4: The apparatus of any one of Aspects 1 to 3, wherein the scene-decompositional model comprises a first set of invertible learning blocks, a first squeeze layer, a first split layer, a second set of invertible learning blocks, a second squeeze layer, a second split layer, and a spatial transformer network.

Aspect 5: The apparatus of Aspect 4, wherein each invertible learning block implements one or more bijective functions.

Aspect 6: The apparatus of any one of Aspects 4 or 5, wherein each of the first squeeze layer and the second squeeze layer is configured to reshape an input tensor and reduce a spatial dimension of input data processed by each of the first squeeze layer and the second squeeze layer.

Aspect 7: The apparatus of any one of Aspects 4 to 6, wherein the first split layer is configured to partition an output from the first squeeze layer into a latent representation of a background of the scene and a foreground of the scene including a latent representation of a target from the multiple targets.

Aspect 8: The apparatus of Aspect 7, wherein the second split layer is configured to slice a received tensor from its input layer channel-wise, wherein a set of partitioned channels comprises one or more channels corresponding to a latent representation of object location variables, one or more channels corresponding to a latent representation of object size variables, and one or more channels corresponding to a latent representation of object attribute variables.

Aspect 9: The apparatus of Aspect 8, wherein the object attribute variables comprise at least one of color variables and appearance variables.

Aspect 10: The apparatus of any one of Aspects 4 to 9, wherein the first set of invertible learning blocks is configured to map an input image into the one or more background components and the one or more foreground components.

Aspect 11: The apparatus of any one of Aspects 4 to 10, wherein the spatial transformer network is configured to perform spatial sampling from a patch of data based on scale latent variables and position latent variables.

Aspect 12: The apparatus of any one of Aspects 1 to 11, wherein the at least one processor is configured to: reconstruct the data depicting the multiple targets in the scene based on a binary map that partitions the scene into a foreground and a background.

Aspect 13: The apparatus of any one of Aspects 1 to 12, wherein the at least one processor is configured to separate respective representations of the multiple targets depicted in the data depicting the multiple targets in the scene.

Aspect 14: The apparatus of any one of Aspects 1 to 13, wherein at least one target of the multiple targets comprises a person, and wherein, to identify the target, the at least one processor is further configured to localize the person in the data depicting the multiple targets in the scene.

Aspect 15: The apparatus of any one of Aspects 1 to 14, wherein the data comprises at least one of an image and a spectrogram of a radio frequency signal.

Aspect 16: The apparatus of any one of Aspects 1 to 15, wherein the scene-decompositional model is trained using unsupervised training.

Aspect 17: The apparatus of any one of Aspects 1 to 16, wherein the representation of the target includes a representation of a location of the target in an output image.

Aspect 18: The apparatus of any one of Aspects 1 to 17, further comprising a camera configured to capture the data depicting multiple targets in the scene.

Aspect 19: The apparatus of any one of Aspects 1 to 18, wherein the apparatus comprises a mobile device.

Aspect 20: A processor-implemented method for processing data, the method comprising: determining, based on processing data depicting multiple targets in a scene using a scene-decompositional model having a normalizing flow neural network architecture, a distribution of scene data as a mixture of flows from one or more background components and one or more foreground components; processing the distribution of scene data using the scene-decompositional model; identifying, based on the processing of the distribution of the scene data using the scene-decompositional model, a target associated with the one or more foreground components and included in the data depicting the multiple targets in the scene; and outputting a representation of the target.

Aspect 21: The processor-implemented method of Aspect 20, further comprising: identifying, based on processing the distribution of the scene data using the scene-decompositional model, a background of the scene associated with the one or more background components and included in the data depicting the multiple targets in the scene.

Aspect 22: The processor-implemented method of any one of Aspects 20 or 21, wherein identifying the target comprises: decomposing the scene into a background representation corresponding to a background of the scene and a respective representation of each target from the multiple targets.

Aspect 23: The processor-implemented method of any one of Aspects 20 to 22, wherein the scene-decompositional model comprises a first set of invertible learning blocks, a first squeeze layer, a first split layer, a second set of invertible learning blocks, a second squeeze layer, a second split layer, and a spatial transformer network.

Aspect 24: The processor-implemented method of Aspect 23, wherein each invertible learning block implements one or more bijective functions.

Aspect 25: The processor-implemented method of any one of Aspects 23 or 24, wherein each of the first squeeze layer and the second squeeze layer is configured to reshape an input tensor and reduce a spatial dimension of input data processed by each of the first squeeze layer and the second squeeze layer.

Aspect 26: The processor-implemented method of any one of Aspects 23 to 25, wherein the first split layer is configured to partition an output from the first squeeze layer into a latent representation of a background of the scene and a foreground of the scene including a latent representation of a target from the multiple targets.

Aspect 27: The processor-implemented method of Aspect 26, wherein the second split layer is configured to slice a received tensor from its input layer channel-wise, wherein a set of partitioned channels comprises one or more channels corresponding to a latent representation of object location variables, one or more channels corresponding to a latent representation of object size variables, and one or more channels corresponding to a latent representation of object attribute variables.

Aspect 28: The processor-implemented method of Aspect 27, wherein the object attribute variables comprise at least one of color variables and appearance variables.

Aspect 29: The processor-implemented method of any one of Aspects 23 to 28, wherein the first set of invertible learning blocks is configured to map an input image into the one or more background components and the one or more foreground components.

Aspect 30: The processor-implemented method of any one of Aspects 23 to 29, wherein the spatial transformer network is configured to perform spatial sampling from a patch of data based on scale latent variables and position latent variables.

Aspect 31: The processor-implemented method of any one of Aspects 20 to 30, further comprising: reconstructing the data depicting the multiple targets in the scene based on a binary map that partitions the scene into a foreground and a background.

Aspect 32: The processor-implemented method of any one of Aspects 20 to 31, further comprising separating respective representations of the multiple targets depicted in the data depicting the multiple targets in the scene.

Aspect 33: The processor-implemented method of any one of Aspects 20 to 32, wherein at least one target of the multiple targets comprises a person, and wherein identifying the target comprises localizing the person in the data depicting the multiple targets in the scene.

Aspect 34: The processor-implemented method of any one of Aspects 20 to 33, wherein the data comprises at least one of an image and a spectrogram of a radio frequency signal.

Aspect 35: The processor-implemented method of any one of Aspects 20 to 34, wherein the scene-decompositional model is trained using unsupervised training.

Aspect 36: The processor-implemented method of any one of Aspects 20 to 35, wherein the representation of the target includes a representation of a location of the target in an output image.

Aspect 37: At least one non-transitory computer-readable medium containing instructions which, when executed by one or more processors, cause the one or more processors to perform a method according to any of Aspects 1 to 36.

Aspect 38: An apparatus comprising means for performing a method according to any of Aspects 1 to 36.

What is claimed is:

1. An apparatus for processing data, the apparatus comprising:
   at least one memory; and
   at least one processor coupled to the at least one memory, the at least one processor configured to:
   determine, based on data depicting multiple targets in a scene, a distribution of scene data as a mixture of flows from one or more background components and one or more foreground components, the distribution of scene data being determined using a scene-decompositional model having a normalizing flow neural network architecture;
   process the distribution of scene data using the scene-decompositional model;
   identify, based on the processing of the distribution of the scene data using the scene-decompositional model, a target associated with the one or more foreground components and included in the data depicting the multiple targets in the scene; and
   output a representation of the target.

2. The apparatus of claim 1, wherein the at least one processor is configured to:
   identify, based on processing the distribution of the scene data using the scene-decompositional model, a background of the scene associated with the one or more background components and included in the data depicting the multiple targets in the scene.

3. The apparatus of claim 1, wherein, to identify the target, the at least one processor is configured to:
   decompose the scene into a background representation corresponding to a background of the scene and a respective representation of each target from the multiple targets.

4. The apparatus of claim 1, wherein the scene-decompositional model comprises a first set of invertible learning blocks, a first squeeze layer, a first split layer, a second set of invertible learning blocks, a second squeeze layer, a second split layer, and a spatial transformer network.

5. The apparatus of claim 4, wherein each invertible learning block implements one or more bijective functions.

6. The apparatus of claim 4, wherein each of the first squeeze layer and the second squeeze layer is configured to reshape an input tensor and reduce a spatial dimension of input data processed by each of the first squeeze layer and the second squeeze layer.

7. The apparatus of claim 4, wherein the first split layer is configured to partition an output from the first squeeze layer into a latent representation of a background of the scene and a foreground of the scene including a latent representation of a target from the multiple targets.

8. The apparatus of claim 7, wherein the second split layer is configured to slice a received tensor from its input layer channel-wise, wherein a set of partitioned channels comprises one or more channels corresponding to a latent representation of object location variables, one or more channels corresponding to a latent representation of object size variables, and one or more channels corresponding to a latent representation of object attribute variables.

9. The apparatus of claim 8, wherein the object attribute variables comprise at least one of color variables or appearance variables.

10. The apparatus of claim 4, wherein the first set of invertible learning blocks is configured to map an input image into the one or more background components and the one or more foreground components.

11. The apparatus of claim 4, wherein the spatial transformer network is configured to perform spatial sampling from a patch of data based on scale latent variables and position latent variables.

12. The apparatus of claim 1, wherein the at least one processor is configured to:
   reconstruct the data depicting the multiple targets in the scene based on a binary map that partitions the scene into a foreground and a background.

13. The apparatus of claim 1, wherein the at least one processor is configured to separate respective representations of the multiple targets depicted in the data depicting the multiple targets in the scene.

14. The apparatus of claim 1, wherein at least one target of the multiple targets comprises a person, and wherein, to identify the target, the at least one processor is further configured to localize the person in the data depicting the multiple targets in the scene.

15. The apparatus of claim 1, wherein the data comprises at least one of an image or a spectrogram of a radio frequency signal.

16. The apparatus of claim 1, wherein the scene-decompositional model is trained using unsupervised training.

17. The apparatus of claim 1, wherein the representation of the target includes a representation of a location of the target in an output image.

18. The apparatus of claim 1, further comprising a camera configured to capture the data depicting multiple targets in the scene.

19. A processor-implemented method for processing data, the method comprising:
determining, based on processing data depicting multiple targets in a scene using an scene-decompositional model having a normalizing flow neural network architecture, a distribution of scene data as a mixture of flows from one or more background components and one or more foreground components;
processing the distribution of scene data using the scene-decompositional model;
identifying, based on the processing of the distribution of the scene data using the scene-decompositional model, a target associated with the one or more foreground components and included in the data depicting the multiple targets in the scene; and
outputting a representation of the target.

20. The processor-implemented method of claim 19, further comprising:
identifying, based on the processing of the distribution of the scene data using the scene-decompositional model, a background of the scene associated with the one or more background components and included in the data depicting the multiple targets in the scene.

21. The processor-implemented method of claim 19, wherein identifying the target comprises:
decomposing the scene into a background representation corresponding to a background of the scene and a respective representation of each target from the multiple targets.

22. The processor-implemented method of claim 19, wherein the scene-decompositional model comprises a first set of invertible learning blocks, a first squeeze layer, a first split layer, a second set of invertible learning blocks, a second squeeze layer, a second split layer, and a spatial transformer network.

23. The processor-implemented method of claim 22, wherein each invertible learning block implements one or more bijective functions, and wherein each of the first squeeze layer and the second squeeze layer is configured to reshape an input tensor and reduce a spatial dimension of input data processed by each of the first squeeze layer and the second squeeze layer.

24. The processor-implemented method of claim 22, wherein:
the first split layer is configured to partition an output from the first squeeze layer into a latent representation of a background of the scene and a foreground of the scene including a latent representation of a target from the multiple targets; and
the second split layer is configured to slice a received tensor from its input layer channel-wise, wherein a set of partitioned channels comprises one or more channels corresponding to a latent representation of object location variables, one or more channels corresponding to a latent representation of object size variables, and one or more channels corresponding to a latent representation of object attribute variables.

25. The processor-implemented method of claim 24, wherein the object attribute variables comprise at least one of color variables or appearance variables, and wherein the first set of invertible learning blocks is configured to map an input image into the one or more background components and the one or more foreground components.

26. The processor-implemented method of claim 22, wherein the spatial transformer network is configured to perform spatial sampling from a patch of data based on scale latent variables and position latent variables.

27. The processor-implemented method of claim 19, further comprising:
reconstructing the data depicting the multiple targets in the scene based on a binary map that partitions the scene into a foreground and a background.

28. The processor-implemented method of claim 19, further comprising separating respective representations of the multiple targets depicted in the data depicting the multiple targets in the scene.

29. The processor-implemented method of claim 19, wherein at least one target of the multiple targets comprises a person, wherein identifying the target comprises localizing the person in the data depicting the multiple targets in the scene, wherein the data comprises at least one of an image or a spectrogram of a radio frequency signal, and wherein the representation of the target includes a representation of a location of the target in an output image.

30. The processor-implemented method of claim 19, wherein the scene-decompositional model is trained using unsupervised training.

* * * * *